United States Patent
Zervas

(10) Patent No.: US 7,099,538 B2
(45) Date of Patent: Aug. 29, 2006

(54) APPARATUS FOR DISPERSION COMPENSATING A SIGNAL THAT PROPAGATES ALONG A SIGNAL PATH

(75) Inventor: Mikhail Nickolaos Zervas, Southampton (GB)

(73) Assignee: SPI Lasers UK Ltd, Southampton (GB)

( * ) Notice: Subject to any disclaimer, the term of this patent is extended or adjusted under 35 U.S.C. 154(b) by 52 days.

(21) Appl. No.: 10/507,558

(22) PCT Filed: Mar. 10, 2003

(86) PCT No.: PCT/GB03/01017

§ 371 (c)(1), (2), (4) Date: Sep. 14, 2004

(87) PCT Pub. No.: WO03/079585

PCT Pub. Date: Sep. 25, 2003

(65) Prior Publication Data

US 2005/0105850 A1 May 19, 2005

(30) Foreign Application Priority Data

Mar. 14, 2002 (GB) .................. 0205993.9

(51) Int. Cl.
G02B 6/34 (2006.01)
(52) U.S. Cl. ........................................ 385/37
(58) Field of Classification Search .................... 385/37
See application file for complete search history.

(56) References Cited

U.S. PATENT DOCUMENTS

| 5,982,963 | A | * | 11/1999 | Feng et al. | 385/37 |
|---|---|---|---|---|---|
| 6,137,604 | A | * | 10/2000 | Bergano | 398/1 |
| 6,181,852 | B1 | * | 1/2001 | Adams et al. | 385/37 |
| 6,445,852 | B1 | | 9/2002 | Feced et al. | |
| 2001/0048789 | A1 | | 12/2001 | Shiozaki et al. | |
| 2003/0021532 | A1 | * | 1/2003 | Painchaud | 385/37 |

FOREIGN PATENT DOCUMENTS

GB    3 655 610    4/2001

OTHER PUBLICATIONS

"Widely tunable twin fibre grating dispersion compensator for 80Gbit/s" Fells, J. A. J. et al., Optical Fiber Communication Conference ("OFC"). Technical Digest Postconference Ed. Anahein, CA, Mar. 17-22, 2001, Trends In Optics And Photonics Series ("TOPS"), vol. 54, Washington, WA: OSA, US, vol. 1 of 4, Mar. 17, 2001, pp. PD111-PD113, XP010545696. ISBN: 1-55752-655-9.

(Continued)

*Primary Examiner*—Michelle Connelly-Cushwa
(74) *Attorney, Agent, or Firm*—Reidlaw, L.L.C.; John S. Reid

(57) ABSTRACT

Apparatus for dispersion compensating a signal (18) that propagates along a signal path (19), which apparatus comprises a grating (1) and a tuning means (2). The grating (1) is characterized by a wavelength operating range (3) and a group delay (4) that varies with wavelength (5), wherein the group delay (4) is equal at a plurality of pairs of wavelengths (6), (7) that are separated within the wavelength operating range (3), and wherein the grating (1) reflects each wavelength pair (6) from the same region (8) of the grating (1), and different wavelength pairs (7) from different regions (9) of the grating (1).

17 Claims, 15 Drawing Sheets

OTHER PUBLICATIONS

"Sampled fibre grating based-dispersionslope compensator", W. H. Loh, F. Q. Zhou and J. J. Pan, IEEE Photonics Technology Letters, vol. 11, No. 10, pp. 1280-1282, (1999), see also correction, W. H. Loh, et al. IEEE Photonics Technology Letters, vol. 12, No. 3, p. 362 (2000).

"Novel writing technique of long in-fiber Bragg grating and investigation of the linear chirp component", J. Martin, J. Lauzon, S. Thibault and F. Ouellette, Optical Fiber Communication Conference, 1994, postdeadline paper PD29.

"A dispersion tunable grating in a 10Gb/s 100-200km step-index fiber link", R. I. Laming, N. Robinson, P. L. Scrivener, M. N. Zervas, S. Barcelos, L. Reekie and J. A. Tucknott, IEEE Photonics Technology Letters, vol. 8, No. 3, pp. 428-430 (1996).

"Recompression of pulses broadened by transmission through 10km of non-dispersion-shiftedfiber at 1.55 m using 40mm-long optical fiber Bragg gratings with tunable chirp and central wavelength", B. J. Eggleton, K. A. Ahmed, F. Ouellette, P. A. Krug, and H. -F. Liu, IEEE Photonics Technology Letters, vol. 7, No. 5, pp. 494-496 (1995).

"Dispersion tuning of a fiber Bragg grating without a center wavelength shift by applying a strain gradient", T. Imai, T. Komukal and M. Nakazawa, IEEE Photonics Technology Letters, vol. 10, No. 6, pp. 845-847, (1998).

"Optimization of linearly chirped fiber gratings for optical communications",K. Ennser, M. N. Zervas and R. I. Laming, IEEE Journal of Quantum Electronics, vol. 34, No. 5, pp. 770-778 (1998).

"Dynamic dispersion compensation in a 10Gb/s optical system using a novel voltage tuned nonlinearly chirped fibre Bragg grating", K. -M. Feng, J. -X. Cai, V. Grubsky, D. S. Starodubov, M. I. Hayee, S. Lee, X. Jiang, A. E. Willner and J. Feinberg, IEEE Photonics Technology Letters, vol. 11, No. 3, pp. 373-375, (1999).

"Twin fiber grating tunable dispersion compensator", J. A. J. Fells, S. E. Kanellopoulos, P. J. Bennet, V. Baker, H. F. M. Priddle, W. S. Lee, A. J. Collar, C. B. Rogers, D. P. Goodchild, R. Feced, P. J. Pugh, S. J. Clements and A. Hadjifotiou, IEEE Photonics Technology Letters, vol. 13, No. 9, pp. 984-986, (2001).

"An efficient inverse scattering algorithm for the design of nonuniform fibre Bragg gratings", R. Feced, M. N. Zervas and M. Miguel, IEEE J. Quantum Electronics, vol. 35, p. 1105-1115 (1999).

"Simple grating synthesis algorithm", L. Poladian, Opt. Lett., vol. 35, pp. 787-789 (2000).

"On the synthesis of Bragg gratings by layer peeling", J. Skaar, L. Wang,and T. Erdogan, IEEE J. Quantum Electronics, vol. 37, p. 165-173 (2001).

* cited by examiner

APPARATUS FOR DISPERSION COMPENSATING A SIGNAL THAT PROPAGATES ALONG A SIGNAL PATH

CROSS REFERENCE TO RELATED APPLICATIONS

The present application is a U.S. National Stage filing of Patent Cooperation Treaty ("PCT") application serial number PCT/GB03/01017, filed 10 Mar. 2003, which in turn claims priority to United Kingdom (Great Britain) Patent Application Serial Number GB005993.9, filed 14 Mar. 2002.

FIELD OF INVENTION

This invention relates to an apparatus for dispersion compensating a signal that propagates along a signal path. The invention has application for communication systems.

BACKGROUND TO THE INVENTION

Chromatic dispersion (i.e. wavelength dependence of group velocity) results in temporal spreading of optical pulses as they propagate along a signal path such as an optical fibre. This sets a limit on the maximum propagation distance, before adjacent pulses start overlapping severely and become indistinguishable. At this point, optical pulses should be recompressed to their initial duration, the recompression being done electrically or optically. Chromatic-dispersion propagation limits depend on the propagation medium (fibre type), as well as, the initial pulse duration (signal bit rate).

Chromatic dispersion can be characterised by first-, second-, third- and higher-order components of dispersion [1]. First order dispersion corresponds to the average time delay of the pulse. As the pulse propagates along, it will typically disperse, that is, pulse spreading occurs and the pulse typically increases in length. Second order dispersion corresponds to the average increase in pulse width per wavelength per unit length. Third order dispersion corresponds to the variation in pulse spreading per wavelength per unit length. At 1550 nm, the first order dispersion in a standard single mode telecommunication grade optical fibre is approximately $5 \times 10^6$ ps/km, the second order dispersion is 17 ps/nm/km, and the third order dispersion is 0.06 ps2/nm/km.

Tuneable dispersion compensation is important in high-speed, high performance long-haul and metro telecommunication systems. Although in the metro systems the transmission distances are much shorter than the ones in long-haul systems, it is quite likely that they will vary substantially as the system is dynamically reconfigured and certain channels are switched at the various nodes. Tuneable dispersion compensation modules (DCMs) will be used either in a static tune-and-set or in a fully dynamic tuning mode, depending on the system architecture, bit rates and transmission distances.

A number of different tunable DCMs have been proposed based on fibre Bragg gratings (FBGs). They can be divided into two broad categories. The first involves standard linearly-chirped apodized gratings, which are tuned by applying a perturbation whose strength varies linearly along the grating length. The second involves nonlinearly-chirped gratings, which are tuned by applying a perturbation whose strength is typically constant along the grating length (although it can be non-linear).

The most common techniques for applying an additional linear chirp on a FBG involve a temperature [2,3] or strain gradient [4,5] along the grating length. The main problem with this technique originates from the characteristics of the grating. Linearly chirped, apodized gratings are known to suffer from an underlying non-linearity of the group delay variation with wavelength, due to the presence of residual relatively strong, overlapping band-gaps within the reflection spectrum [6]. This group-delay non-linearity can be improved by applying a tighter apodisation profile, although this is accomplished at the expense of the reflection spectrum squareness [6]. For all apodisation profiles, the group-delay nonlinearity gets worse when the total (initial+induced) chirp and, consequently the average linear dispersion, reduce. This compromises the performance and limits the tuning range of the DCM considerably. The grating is also relatively long and difficult to manufacture.

In the second category, a DCM is accomplished by using a more complex grating and a uniform perturbation (such as uniform stretching/compressing or uniform heating/cooling). The grating is non-linearly chirped so that it exhibits both second- and third-order chromatic dispersion. Such a device exhibits a linearly varying dispersion across the reflection band. Chromatic dispersion tuning is achieved by shifting the reflection spectrum relative to optical carrier wavelength. In the simplest configuration, such a DCM can be implemented using only one non-linearly chirped grating [7]. This approach, however, inevitably introduces an amount of third-order chromatic dispersion, which can potentially limit the usefulness of the device at high bit rates (e.g. $\geq 40$ Gb/s). In addition, any relative transmitter/DCM wavelength drift results in chromatic dispersion variation. These problems can be overcome by connecting two identical (twin) non-linearly chirped gratings (in an inverse manner) into a four-port circulator [8,9]. This configuration cancels out the third-order chromatic dispersion of the individual gratings and provides pure second-order chromatic dispersion compensation (a much desirable feature). However, the penalty to be paid, compared to the other single-grating approaches, is the increased number (twice as many) gratings and the use of one four-port or two three-port circulators per DCM unit. In addition, the gratings are relatively long and difficult to manufacture.

There are a variety of other DCM technologies including dispersion compensating fibres and various filter and device types such as concatenated Mach Zehnder interferometers, ring interferometers, and arrayed waveguide gratings. Several of these technologies provide lower cost solutions, but at the expense of reduced performance, particularly in tuneable configurations.

An aim of the present invention is to produce an apparatus for dispersion compensating a signal that propagates along a signal path that reduces the above aforementioned problems.

SUMMARY OF THE INVENTION

According to a non-limiting embodiment of the present invention there is provided apparatus for dispersion compensating a signal that propagates along a signal path, which apparatus comprises a grating and a tuning means, wherein the grating is characterized by a wavelength operating range and a group delay that varies with wavelength, wherein the group delay is equal at a plurality of pairs of wavelengths that are separated within the wavelength operating range, and wherein the grating reflects each wavelength pair from the same region of the grating, and different wavelength pairs from different regions of the grating.

Shorter gratings that compensate for third order dispersion ("folded gratings") have been described in the literature. However, they would not normally be thought of as useful for inclusion in apparatus for dispersion compensating a signal that propagates along a signal path, because the folded grating is conceptually very difficult to understand in its static form. Furthermore, of the very few persons skilled in the art that would understand the concept in its static form, no-one would think of the further step required for the apparatus of the invention, namely a dynamic configuration in which the folded grating is tuned. Thus the concept of using a tuneable folded grating to compensate for errors induced in a DCM is completely novel, especially when the DCM is tuneable. The advantage of the present invention is significant in that the apparatus provides the required performance at a lower overall system cost and lower manufacturing complexity.

The grating may be a fibre Bragg grating.

The grating may be characterised by a second order dispersion and a third order dispersion, and in which the magnitude of the product of half the third order dispersion and the wavelength operating range is greater than the magnitude of the second order dispersion.

The grating may comprise a plurality of lines, and in which the separation between the lines is equal.

The grating may comprise a plurality of lines, and in which the separation between the lines varies.

The tuning means may comprise a fibre stretcher, a fibre compressor, a bender, or a heating element. The tuning means may be configured to perturb the grating such that the grating has a uniform strain applied along at least a portion of its length. The tuning means may be configured to perturb the grating linearly along its length. The tuning means may be configured to perturb the grating non-linearly along its length.

The apparatus may comprise a dispersion compensator for providing primary compensation of the signal. The dispersion compensator may comprise dispersion compensating fibre. The dispersion compensator may comprise a chirped fibre Bragg grating. The dispersion compensator may comprise two chirped fibre Bragg gratings having chirps of the opposite sense. The two fibre Bragg gratings may be of the same design or of different designs. The dispersion compensator may be tuneable.

BRIEF DESCRIPTION OF THE DRAWINGS

Embodiments of the invention will now be described solely by way of example and with reference to the accompanying drawings in which.

DETAILED DESCRIPTION OF PREFERRED EMBODIMENTS OF THE INVENTION

Figure 36:
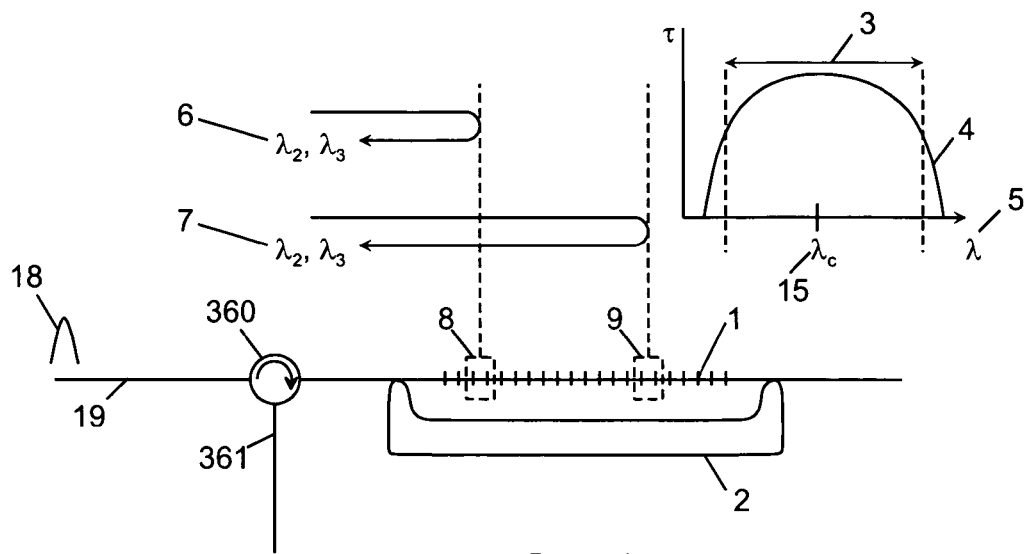
FIG. 36 shows an apparatus according to the present invention.

With reference to FIG. 36, there is provided apparatus for dispersion compensating a signal 18 that propagates along a signal path 19, which apparatus comprises a grating 1 and a tuning means 2. The grating 1 is characterized by a wavelength operating range 3 and a group delay 4 that varies with wavelength 5, wherein the group delay 4 is equal at a plurality of pairs of wavelengths 6, 7 that are separated within the wavelength operating range 3, and wherein the grating 1 reflects each wavelength pair 6 from the same region 8 of the grating 1, and different wavelength pairs 7 from different regions 9 of the grating 1. Also shown is the centre wavelength 15 of the grating 1, a circulator 360 and an output port 361.

The grating 1 shown in FIG. 36 can be a fibre Bragg grating FBG formed in a single mode fibre. Inverse scattering procedures for designing FBGs are described in U.S. Pat. No. 6,445,852 and techniques to manufacture gratings are described in U.S. Pat. No. 6,072,926, both of which are hereby incorporated by reference herein.

Figure 37:
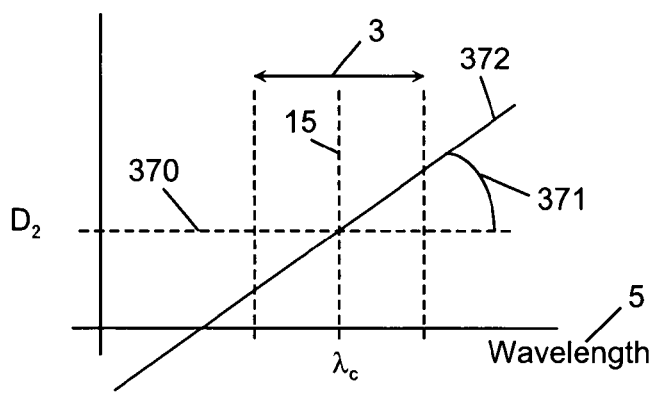
FIG. 37 shows the dispersion variation with wavelength of the apparatus of FIG. 36.

The grating 1 can be characterised by a second order dispersion 370 and a third order dispersion 371 as shown with reference to FIG. 37. The third order dispersion 371 is the slope of the dispersion 372 with respect to wavelength. The magnitude of the product of half the third order dispersion 371 and the wavelength operating range 3 is preferably greater than the magnitude of the second order dispersion 370.

With reference to FIG. 36, the grating 1 comprises a plurality of lines 16. The separation between the lines 16 can be equal or can vary along the length of the grating 1.

The tuning means 2 can comprise a fibre stretcher for applying tensile strain to the grating, a fibre compressor for applying compressive strain to the grating, a bender for bending the grating, or a heating element for heating the grating. Such techniques are known in the art for tuning fibre Bragg gratings.

The tuning means 2 can be configured to perturb the grating 1 such that the grating 1 has a uniform strain applied along at least a portion of its length. The tuning means 1 can be configured to perturb the grating 1 linearly along its length. The tuning means 1 can be configured to perturb the grating 1 non-linearly along its length.

Figure 38:
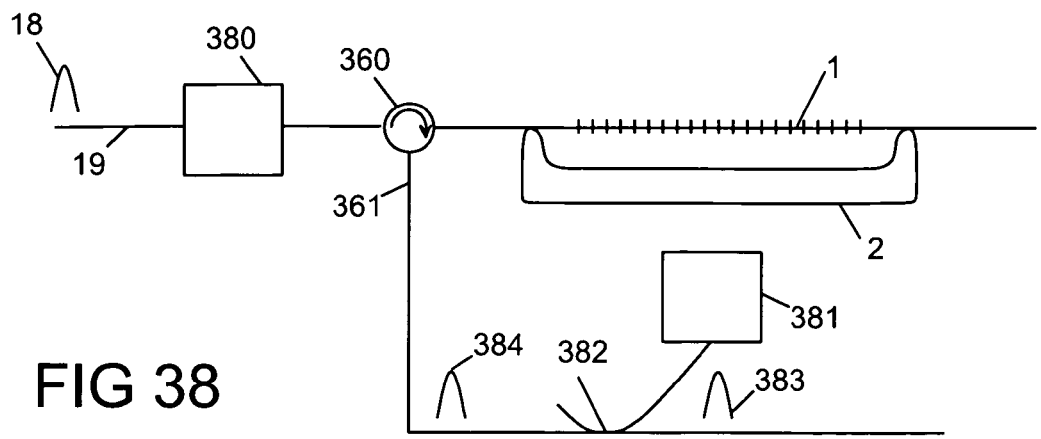
FIG. 38 shows an apparatus according to the present invention comprising a dispersion compensator.

FIG. 38 shows an apparatus according to the invention, which comprises a dispersion compensator 380 for providing primary compensation of the signal 18. The dispersion compensator 380 can comprise dispersion compensating fibre, a chirped fibre Bragg grating, two chirped fibre Bragg gratings having chirps of the opposite sense. The dispersion compensator 380 can be tuneable. By primary compensation, it is meant the compensation of the second order dispersion 370 that builds up along the length of the signal path 19. A tap 382 (such as formed by a fused fibre coupler) is used to derive a control signal 383 by removing a small portion of the compensated signal 384. The control signal 383 is input into a controller 381 which provides a feedback signal to the tuning means 2 in order to reduce any residual second 370 and third order dispersion 371. Tuneable dispersion compensators and their integration into telecommunication systems (including the electronic derivation of feedback signals) are described in U.S. Pat. Nos. 5,943,151, 5,982,963, 6,266,463 and 6,271,952 which are hereby incorporated herein by reference.

A detailed description is now provided of prior art solutions together with various examples of gratings 1 that can be used in the apparatus of the present invention. It is important to note that these examples are meant to be non-limiting, and although described with detailed mathematical exactness are not meant to be limited to the particular apparatus shown in each of the various cases shown. In particular, the various arrangements can be utilized in various combinations and arrangements and can be used, for example, as replacements or used in addition to the various components and modules shown in FIG. 38.

Figure 1:
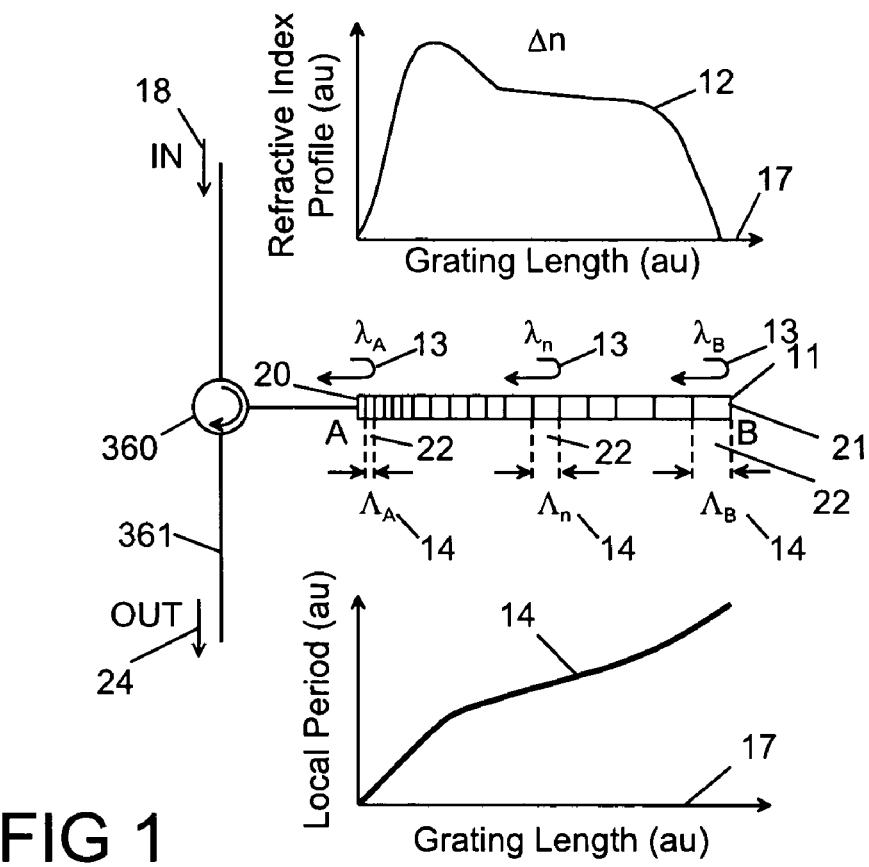
FIG. 1 shows a fibre Bragg grating.

With reference to FIG. 1, the refractive index variation along a grating 11 can be generally described by:

$$n(z) = n_0 + \Delta n_0(z) = n_0 + \Delta n(z)\cos\left(\frac{2\pi}{\Lambda(z)}z\right) \quad (1)$$

where $n_0$ is the average background refractive index, $\Delta n(z)$ is the refractive-index-variation amplitude (or refractive-index profile) and $\Lambda(z)$ is the local period 14 at position z 17 along the grating 11. The grating 11 operates by reflecting the signal 18 to yield the output signal 24 at the output port 361.

To a first-order approximation, in a chirped grating extended from a front point A 20 to a far point B 21, different wavelengths 13 are effectively reflected at different positions 22 along the grating length 17. At each effective reflection point 22, the reflected wavelength 13 is matching the local grating period 14 though the Bragg relation, namely:

$$\lambda_n = 2n_0\Lambda_n \quad (2)$$

Therefore, there is a direct mapping between each reflected wavelength 13 and its corresponding position 22 along the grating length 17. The refractive-index profile $\Delta n$ 12 can also vary along the grating length 17. The local-period $\Lambda(z)$ 14 can be a non-linear function of the position along the grating length 17.

Figure 2:
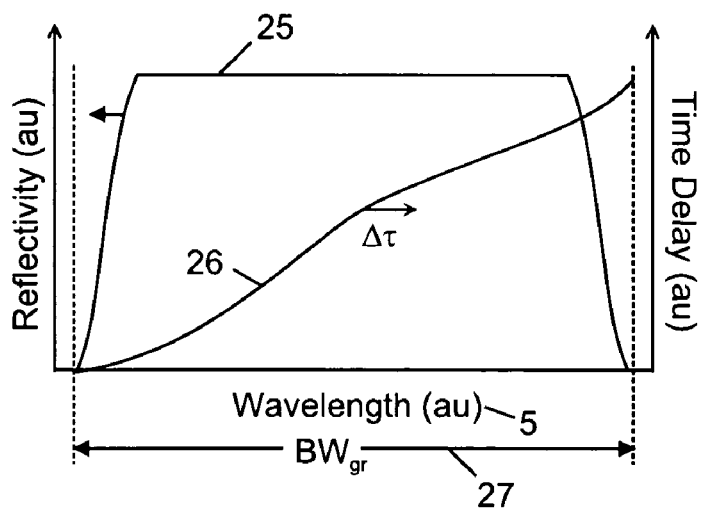
FIG. 2 shows the reflectivity and group delay of the grating.

FIG. 2 shows the reflectivity spectrum 25 and time delay 26 (or group delay) as a function of wavelength 3 for a non-linearly chirped grating. The reflection bandwidth (BWgr) 27 is a measure of the wavelength operating range 3 shown in FIG. 1.

The temporal response of the grating 11 can equivalently be described by the variation of the chromatic dispersion across the reflection bandwidth ($BW_{gr}$). Linear chromatic dispersion D (also known as second-order dispersion $D_2$) is defined as:

$$D \equiv D_2 = \frac{d\Delta\tau}{d\lambda} \quad (2)$$

Figure 3:
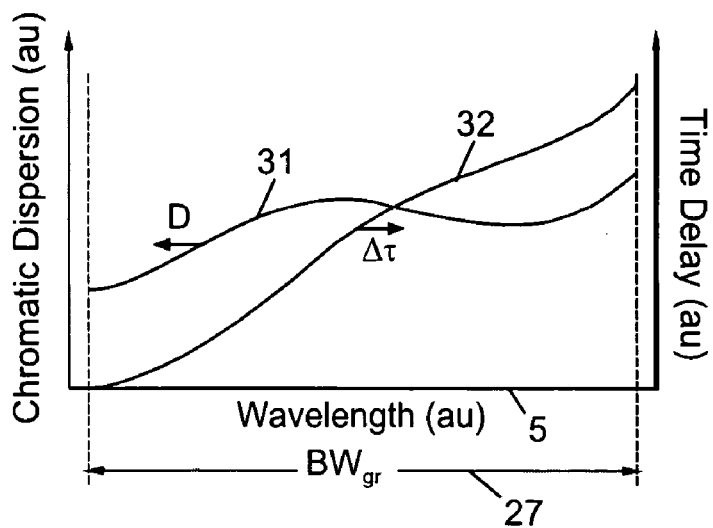
FIG. 3 shows the variation of chromatic dispersion with wavelength.

FIG. 3 shows a schematic of the linear chromatic dispersion D 31 and corresponding time-delay $\Delta\tau$ 32 as a function of the wavelength 5, for a non-linearly chirped grating. In case that the linear chromatic dispersion D varies with wavelength over the reflection bandwidth, we can introduce the chromatic dispersion slope (or third-order chromatic dispersion) as:

$$D_3 = \frac{dD}{d\lambda} = \frac{d^2\Delta\tau}{d\lambda^2} \quad (3)$$

As an example, a quadratic variation of the time delay across the reflection band corresponds to a linearly-varying 2nd-order chromatic dispersion and a constant third-order chromatic dispersion (or dispersion slope).

In prior art [7, Phaethon], the grating is non-linearly chirped so that it exhibits both second- and third-order chromatic dispersion. Such a device exhibits a linearly-varying $2^{nd}$-order chromatic dispersion across the reflection band. Chromatic dispersion tuning is achieved by shifting the reflection spectrum relative to optical carrier wavelength. In the simplest configuration, such a DCM can be implemented using only one non-linearly chirped grating [7]. This approach, however, introduces an amount of third-order chromatic dispersion, which can potentially limit the usefulness of the device at high bit rates (e.g. $\geq$40 Gb/s). In addition, any relative transmitter/DCM wavelength drift results in chromatic dispersion variation.

Figure 4:
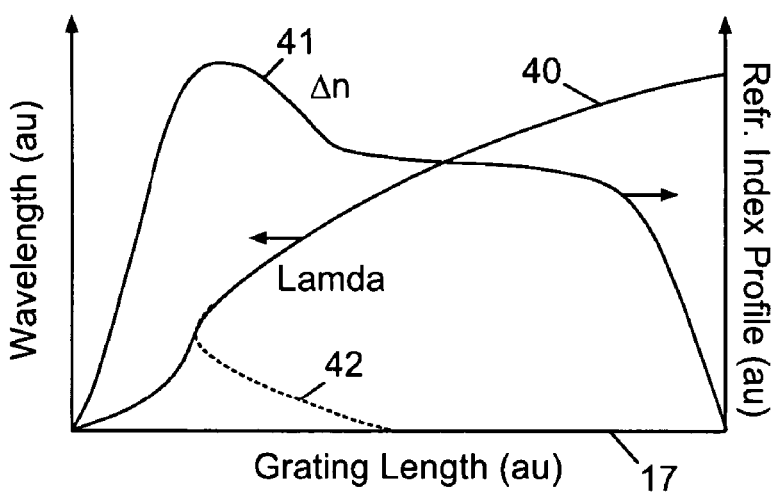
FIG. 4 shows a refractive index map of a prior art grating.

These problems can be overcome by connecting two identical (twin) non-linearly chirped gratings (in an inversed manner) into a four-port circulator [8,9]. This configuration cancels out the third-order chromatic dispersion of the individual gratings and provides pure second-order chromatic dispersion compensation (a much desirable feature). FIG. 4 shows a schematic of the reflected wavelength map 40 (solid line—left axis) and the refractive-index profile 41 (right axis), as a function of position 17, of the gratings disclosed in prior art [8,9]. The reflected wavelength map 40 shows a quadratic dependence on the grating position over the majority of the grating length. Reversed-quadratic wavelength dependence is introduced over a limited section, at the grating front end, in order to increase the tuning range [9]. The dotted line 42 shows the continuation of the quadratic dependence.

Figure 5:
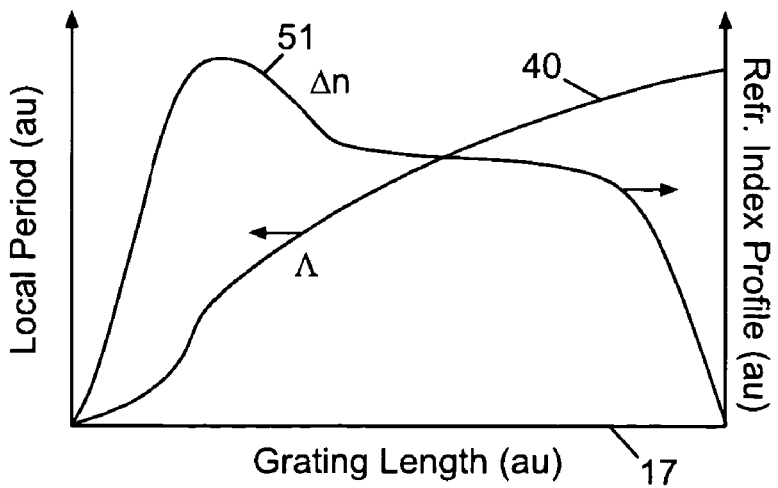
FIGS. 5 and 6 show design curves for a chirped grating.

FIG. 5 shows a schematic of the corresponding local-period variation 51 (left axis) and refractive index profile 40 (right axis) along the length of a realizable non-linearly-chirped grating.

Figure 6:
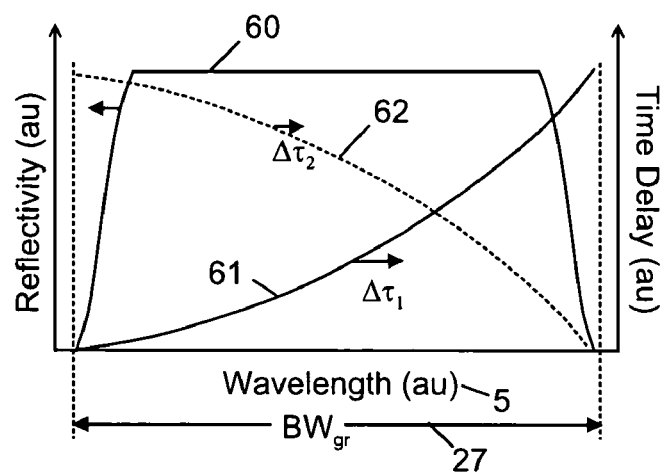
Figure 7:
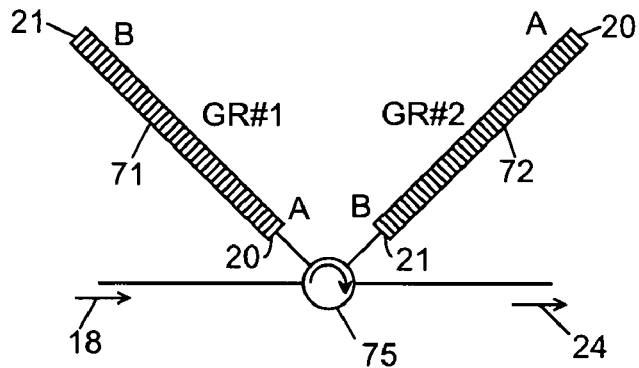
FIG. 7 shows a tuneable chromatic dispersion compensator.

FIG. 6 shows a schematic of the reflectivity 60 (left axis) and time-delay variation 61 $\Delta\tau$ (right axis), as a function of the wavelength 5, for the non-linearly chirped grating 70 shown in FIG. 7 whose design is shown in FIG. 6. $\Delta\tau_1$ refers to the time delay variation 61 when light enters the grating 71 from end A 20 (grating #1) and $\Delta\tau_2$ refers the time delay variation 62 when light enters an identical grating 72 from the opposite end B 21 (grating #2) (refer to FIG. 7). The time delay variation 61 shows a quadratic dependence on the wavelength 5, over the entire reflection bandwidth $BW_{gr}$ 27. The apparatus shown in FIG. 7 is a tuneable chromatic-dispersion compensator using a pair of identical (non-linearly-chirped) gratings, with parameters as shown in FIG. 5, and a four-port circulator 75. The two twin gratings 70, 71 are reversed and connected to the respective ports through opposite ends.

Because of the quadratic variation of the time delay across the reflection band, Equation (2) implies that the linear dispersion of gratings 71 and 72 is described by:

$$D_1(\lambda) = a_1 + b_1 \lambda \quad (4)$$

$$D_2(\lambda) = a_2 + b_2 \lambda \quad (5)$$

Figure 8:
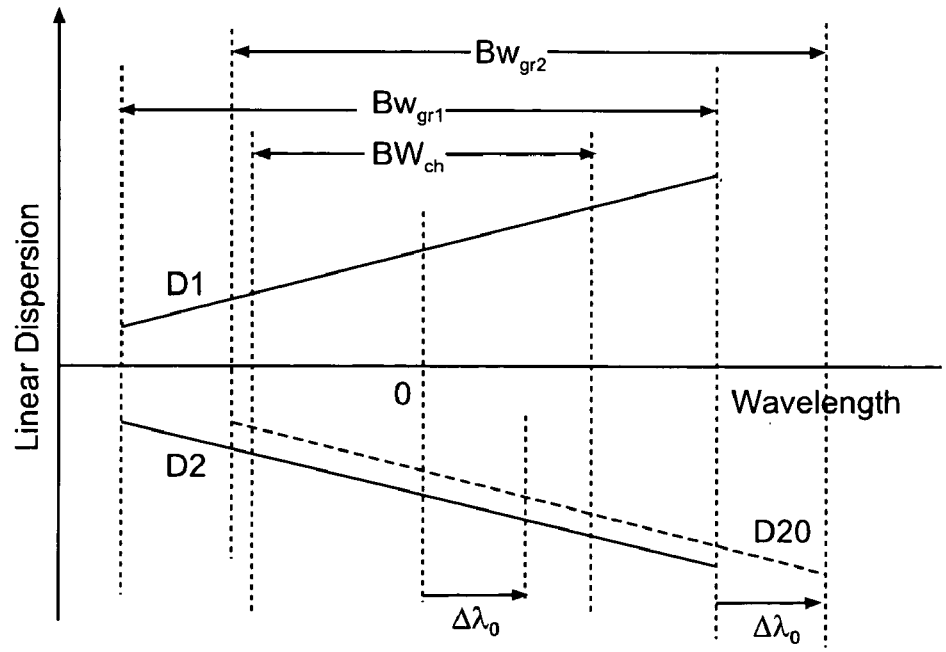
FIG. 8 shows the dispersion of a chirped grating.

Because grating#2 72 is identical to grating#1 71 and operated from the opposite end, the two sets of coefficients are opposite to each other, namely a2=−a1 and b2=−b1. The chromatic dispersion tuning can be achieved by applying a uniform perturbation, such as uniform temperature or strain, along the grating length. This results in a relative shift of the reflection bandwidth of one of the two gratings, for example grating#2 (BWgr2), by $\Delta\lambda 0$ as shown in FIG. 8. In this case, $D_{20}(\lambda) = D_2(\lambda - \Delta\lambda 0)$. The total dispersion DT($\lambda$) of the tuned DCM is given by:

$$D_T(\lambda; \Delta\lambda_0) = D_1(\lambda) + D_{20}(\lambda) = D_1(\lambda) + D_2(\lambda - \Delta\lambda_0) = b_1 \Delta\lambda_0 \quad (6)$$

From the above work, it is evident that the total dispersion is constant over the channel bandwidth (or data bandwidth) $BW_{ch}$ (the wavelength dependence has been cancelled out). At each tuning setting, the obtained linear dispersion is proportional to the relative spectral shift $\Delta\lambda_0$. The total tuning range is $b_1(BW_{gr} - BW_{ch})$.

The current invention may use an unchirped grating that exhibits only third-order chromatic dispersion across its reflection band 3. Such a grating can be designed using any of the inverse scattering techniques [10–12]. The dispersion tuning can be achieved by applying a uniform perturbation, such as uniform temperature or strain, along the grating length.

Unchirped, Pure 3$^{rd}$-Order Chromatic Dispersion Grating

Figure 9:
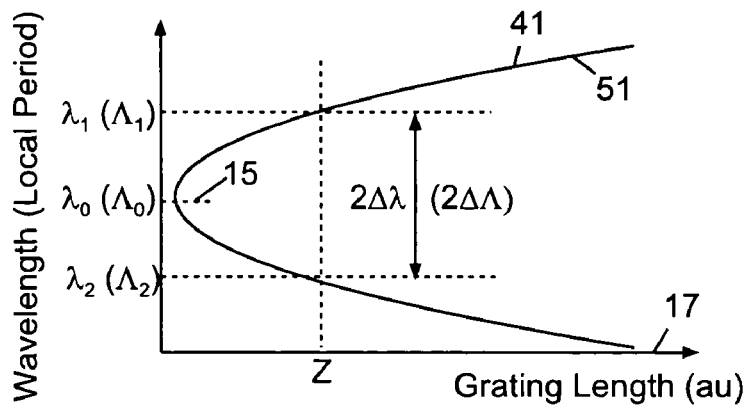
FIG. 9 shows the reflected-wavelength/length mapping 41 of an unchirped pure third order chromatic dispersion grating according to the present invention.

FIG. 9 shows the reflected-wavelength/length mapping 41 of an unchirped pure third order chromatic dispersion grating, which in contrast with the prior art [9] (see FIG. 4), shows a full parabolic (full quadratic) dependence. It should be also stressed that (through Equation (2)) that the local-period/length mapping 51 shows the same dependence.

Figure 10:
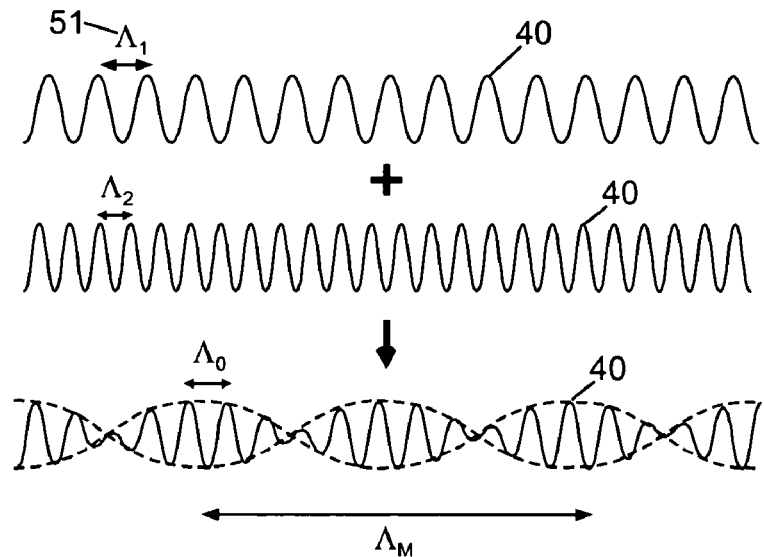
FIG. 10 shows a Moire type structure resulting from the superposition of the refractive index variations of two localised gratings.

The reflected-wavelength/position mapping in FIG. 9 implies that two wavelengths (e.g., $\lambda_1$ and $\lambda_2$) symmetrically placed around the central wavelength $\lambda_0$ (which corresponds to the inflection point) are effectively reflected from the same position z along the grating. This in turn implies that the two corresponding effective gratings with local periods $\Lambda_1$ and $\Lambda_2$ are superimposed. If the two reflected wavelengths are expressed as $\lambda_1 = \lambda_0 + \Delta\lambda(z)$ and $\lambda_2 = \lambda_0 - \Delta\lambda(z)$, the corresponding local periods are $\Lambda_1 = \Lambda_0 + \Delta\Lambda(z)$ and $\Lambda_2 = \Lambda_0 - \Delta\Lambda(z)$, respectively, where $\Lambda_n = \lambda_n/2n_0$ (n=0,1,2) and $\Delta\Lambda(z) = \Delta\lambda(z)/2n_0$. From Equation (1), the refractive index variation of the two localised gratings (shown in FIG. 10) are given by:

$$\Delta n_{01}(z) = \Delta n \cos\left(\frac{2\pi}{\Lambda_1} z\right) \quad (7a)$$

$$\Delta n_{02}(z) = \Delta n \cos\left(\frac{2\pi}{\Lambda_2} z\right) \quad (7b)$$

For simplicity it has been assumed the same constant amplitude for both localised gratings. The refractive index variation of the resultant grating, obtained by the superposition of the individual localised gratings, is given by:

$$\Delta n_{12}(z) = \Delta n_{01}(z) + \Delta n_{01}(z) \quad (8)$$

which after some detailed mathematical manipulation becomes:

$$\Delta n_{12}(z) \approx \Delta n \cos\left(\frac{2\pi}{\Lambda_M(z)} z\right) \cos\left(\frac{2\pi}{\Lambda_0} z\right) \quad (9)$$

where $$\Lambda_M(z) = \frac{\Lambda_0^2}{\Delta\Lambda(z)} \quad (10)$$

Equation (9) shows that the two localised gratings superposition results in a local Moirè-type structure with underlying period $\Lambda_0$ (see second cosine term in Eqn. (9)) and an envelope period $\Lambda_M$ (see first cosine term in Eqn. (9)). This is shown schematically in FIG. 10. Equation (10) shows that the Moirè period $\Lambda_M$ is much larger [by a factor $\Lambda_0/\Delta\Lambda(z)$] than the underlying period $\Lambda_0$. Because of the symmetry of the wavelength (local period) mapping in FIG. 9, the resultant grating is a generalised Moirè structure with the same underlying period $\Lambda_0$ and an envelope periodicity that decreases along the grating length. Such a structure, despite the varying refractive index profile, is unchirped.

Figure 11:
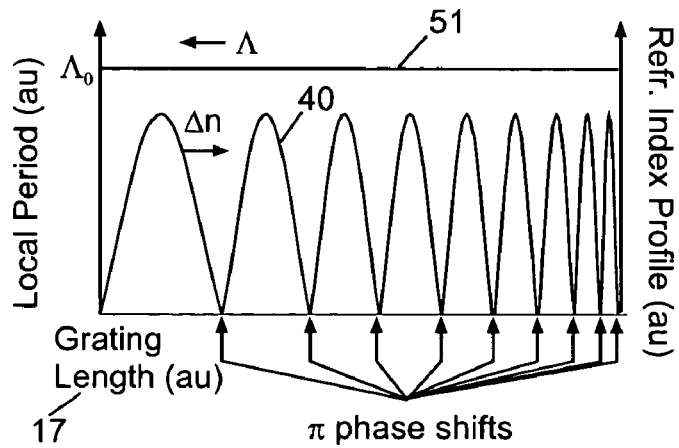
FIG. 11 shows a grating design corresponding to the mapping of FIG. 9.

The constant local period and the varying refractive index profile of such a structure is shown schematically in FIG. 11. Spatial phase shifts of 71 are introduced at the positions along the grating where the refractive index profile becomes zero, in order to implement in a practical manner the negative index variation required along the Moirè period (see Eqn. (9)). The π-phase-shift position is expected to vary along the grating length in a quasi-parabolic (quasi-quadratic) manner.

Figure 12:
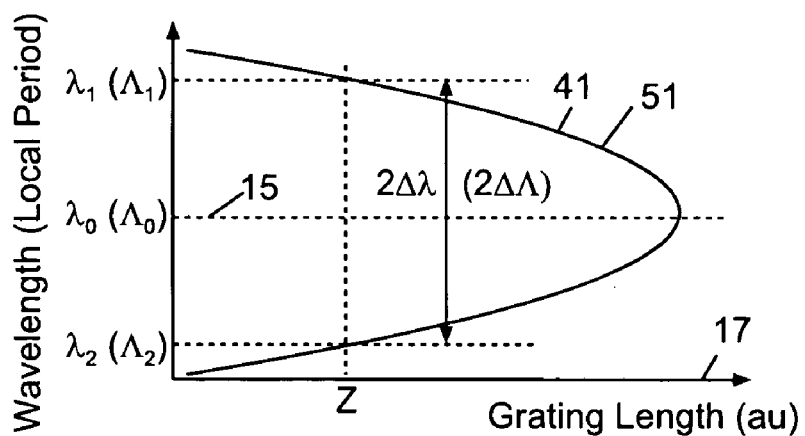
FIGS. 12 and 13 show the reflected wavelength/length mapping and associated grating design corresponding to a reversal in the wavelength (local-period) mapping.
Figure 13:
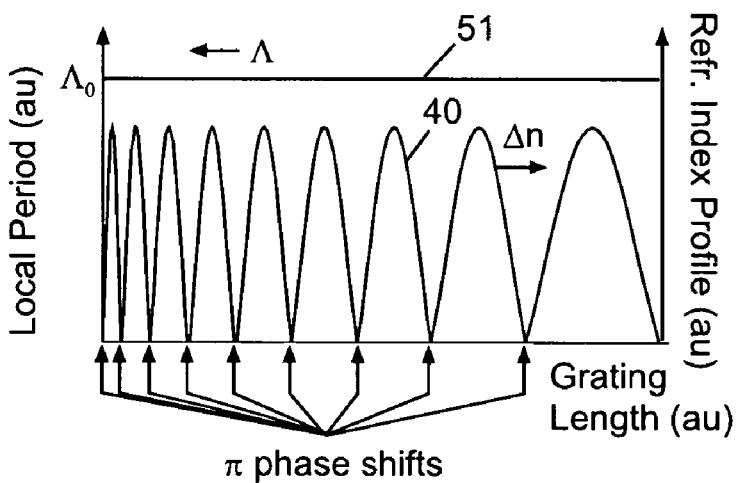

Following similar arguments, we can deduce that a reversal in the wavelength (local-period) mapping, as shown in FIG. 12, will result again in a generalised Moirè grating structure with a reversed refractive index profile. A schematic of the corresponding local-period variation (left axis) and refractive index profile (right axis) along the grating length 17 is shown in FIG. 13. Since in this case that local grating detuning decreases with distance (see FIG. 12), the corresponding Moirè period of the refractive index profile increases with distance, in a quasi-parabolic manner (see FIG. 13).

From the arguments put forward so far, the time delay experienced by each reflected wavelength can be approximated by:

$$\Delta\tau(\lambda) = \frac{2n_0 z_0}{c} \quad (11)$$

where $z_0$ is the effective reflection point (shown schematically in FIG. (9)) and c is the speed of light in vacuum. Because of the assumed parabolic reflected-wavelength mapping, the time delay response of the corresponding grating (see FIG. 11) will also show a parabolic dependence with wavelength. Since the reference wavelength $\lambda_0$ is reflected close to the grating front end, it suffers a minimum time delay while wavelengths on either side suffer progressively larger delays. Using similar arguments, we can deduce that the grating in FIG. 13 will show reversed time-delay dependence, i.e., the reference wavelength $\lambda_0$ that in this case is reflected close to the grating far end suffers maximum time delay.

Figure 14:
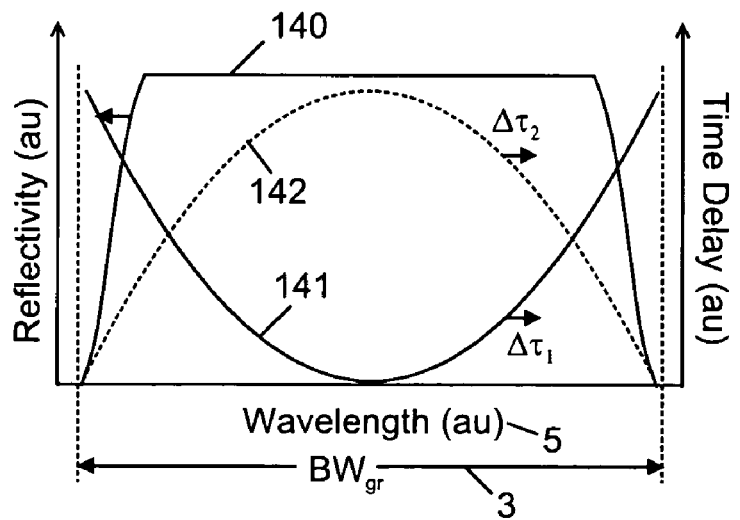
FIG. 14 shows the reflectivity of the grating with wavelength.

The response of the two gratings, shown in FIGS. 11 and 13, is plotted schematically in FIG. 14. The two gratings have the same reflection spectrum 140 (left axis) and reverse parabolic time-delay dependences 141, 142 (right axis). $\Delta\tau_1$ refers to grating#1 (shown in FIG. 11) while $\Delta\tau_2$ refers to grating#2 (shown in FIG. 13).

Figure 15:
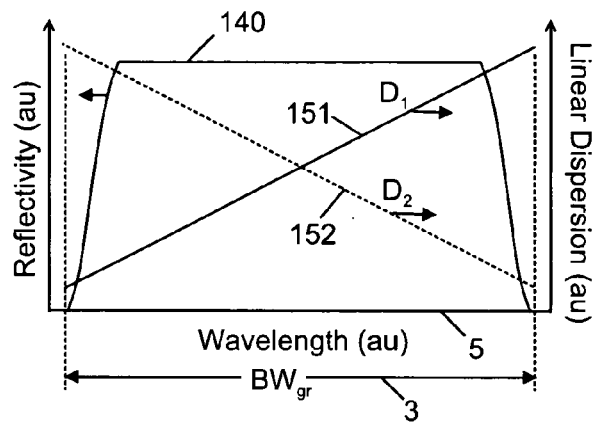
FIG. 15 shows the dispersion of the grating with wavelength.

Because of the parabolic variation of the time delay 141, 142 across the reflection band 3, Equation (2) implies that the linear dispersion of gratings #1 and #2 can be described as:

$$D_1(\lambda)=a_1+b_1\lambda \quad (12)$$

$$D_2(\lambda)=a_2+b_2\lambda \quad (13)$$

where $a_2=a_1=0$ and $b_2=-b_1$. This type of variation of the linear dispersion with wavelength demonstrates that these unchirped gratings are characterised by pure $3^{rd}$-order chromatic dispersion. The $2^{nd}$-order component, described by the coefficients $a_1$ and $a_2$, is zero. The linear dispersion variation 151, 152 is shown schematically in FIG. 15. Note that for both gratings, the linear dispersion 151, 152 goes through zero at the centre of the reflection bandwidth.

Pure $3^{rd}$-order dispersion gratings can be designed using any of the known exact inverse-scattering techniques [10–12], or other approximate design approaches, such as inverse Fourier transform algorithms.

Tuneable Dispersion Compensation Modules

There are a number of different ways that the unchirped, pure $3^{rd}$-order dispersion gratings can be combined with other unchirped, pure $3^{rd}$-order dispersion gratings (with opposite linear dispersion slope) or non-linearly chirped gratings with $2^{nd}$- and $3^{rd}$-order dispersion, in order to provide tuneable dispersion compensator modules. Two dissimilar non-linearly chirped gratings, with $2^{nd}$- and $3^{rd}$-order dispersion components can be used as means of implementing a tuneable dispersion compensator module.

A: Single Unchirped, Pure $3^{rd}$-Order Dispersion Grating Configuration

In this case, we describe a tuneable dispersion compensation module using a single unchirped, pure $3^{rd}$-order dispersion grating 161. The grating 161 can be connected to one of the ports of a three-port circulator 162 (see FIG. 16). It can also be connected to one of the outputs of a 2×2 fibre or waveguide coupler, although at the expense of higher insertion losses.

When the channel (data) bandwidth $BW_{ch}$ is aligned (centred) with respect to the grating bandwidth $BW_{gr}$, the linear dispersion at the centre of the channel bandwidth is zero. The chromatic dispersion tuning can be achieved by applying uniform perturbations, such as uniform temperature or strain, along the grating length. Such uniform perturbation result in a shift of the grating spectrum $BW_{gr10}$ with respect to the channel (data) bandwidth $BW_{ch}$, for example, by $\Delta\lambda_0$. In this new setting, the linear dispersion across the channel bandwidth is given by $$D_{10}(\lambda)=D_1(\lambda-\Delta\lambda_0)=-b_1\Delta\lambda_0+b_1\lambda \quad (14)$$

Therefore, the linear dispersion at the centre of the channel bandwidth is given by $D_0=-b_1\Delta\lambda_0$, i.e. proportional to the relative shift of the grating spectrum $\Delta\lambda_0$. FIG. 17 shows the linear dispersion map 170 of the tuneable chromatic dispersion compensator module 160 using a single unchirped, pure 3rd-order-dispersion grating shown in FIG. 16. From FIG. 17, it can be seen that $-\frac{1}{2}(BW_{gr}-BW_{ch}) \leq \Delta\lambda_0 \leq +\frac{1}{2}(BW_{gr}-BW_{ch})$ and, therefore, the maximum linear-dispersion tuning range is $\Delta D_{max}=b_1(BW_{gr}-BW_{ch})$. Note the solid line shows the dispersion 171 when the grating 161 is unperturbed, and the dashed line shows the dispersion 172 when the grating 162 is perturbed.

Figure 18:
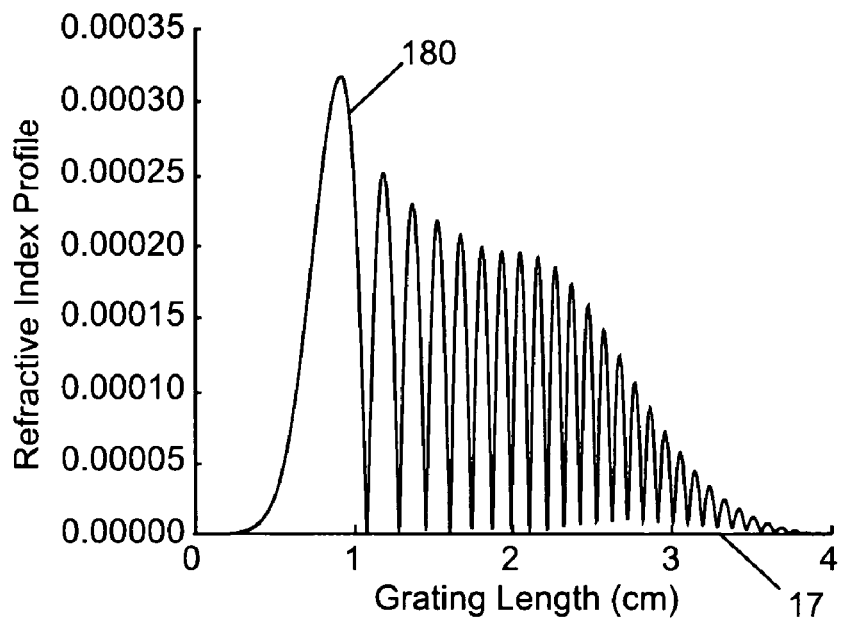
FIGS. 18 to 20 show an example of the refractive index profile 180 and response of the unchirped, pure 3rd-order-dispersion grating.
Figure 19:
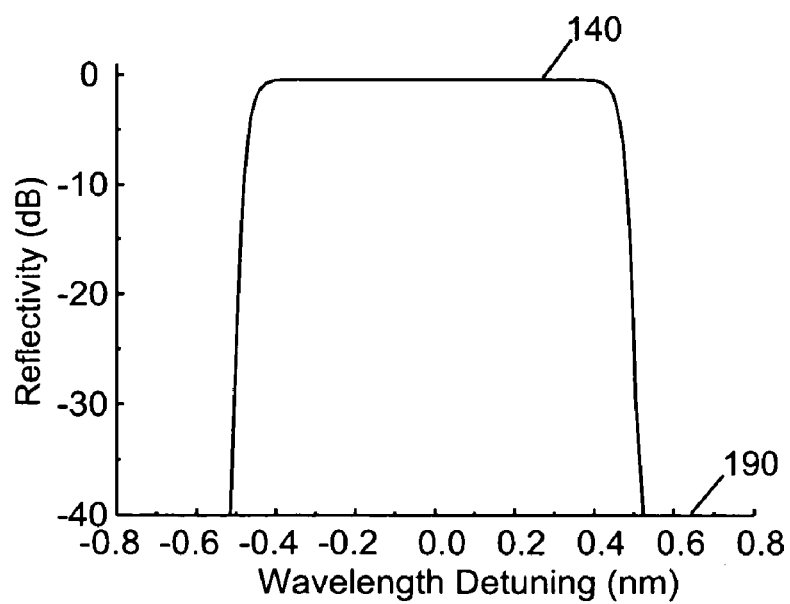
Figure 20:
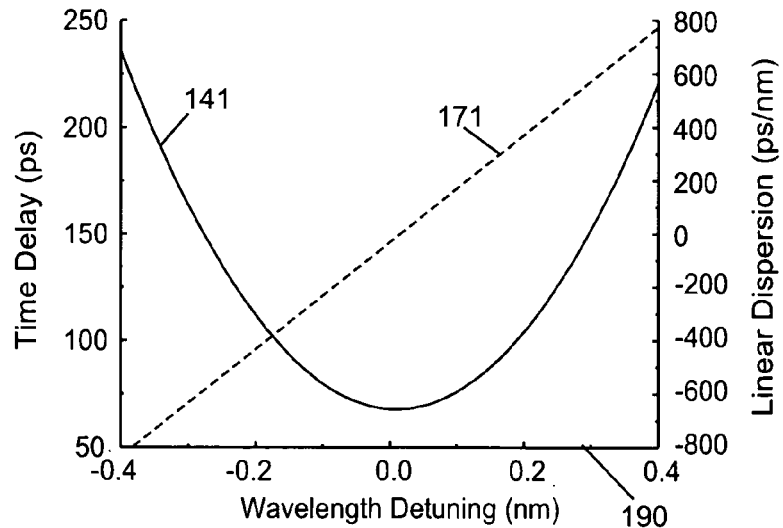

FIGS. 18 to 20 show an example of the refractive index profile 180 and response of an unchirped, pure $3^{rd}$-order-dispersion grating, designed by an inverse-scattering, layer-peeling technique [10–12]. The grating is designed to have a peak reflectivity ($R_{max}$) of 90%, a -0.5 dB bandwidth ($BW_{-0.5\ dB}$) of 0.8 nm, a -30 dB bandwidth ($BW_{-30\ dB}$) of 1 nm and a third-order dispersion coefficient $D_3=b_1=+2000$ ps/nm². Note that second-order dispersion coefficient is zero, i.e., $D_2=a_1=0$ ps/nm. The centre wavelength 15 is $\lambda_0=1550$ nm.

FIG. 18 shows the refractive index profile of the grating described above. The grating is unchirped, i.e., it has a constant underlying period $\Lambda_0=\lambda_0/2n_0$, where $\lambda_0$ is the wavelength at the grating bandwidth centre. As discussed previously, π spatial phase shifts (not shown in the figure) are introduced at the points along the grating length where the refractive index profile approaches zero. The refractive index profile is of a Moire type with varying Moire period. The refractive index profile peaks gradually decrease along the grating length, as the corresponding reflected wavelengths move from the centre towards the edges of the reflection bandwidth. Notice also that the Moire periodicity decreases along the grating length.

FIG. 19 shows the reflection spectrum 140 of the grating shown in FIG. 18 plotted against wavelength detuning 190. FIG. 20 shows the corresponding time delay 141 (solid line—left axis) and linear dispersion variation 171 (dashed line —right axis) across the reflection bandwidth.

B: Two-Grating Configurations

Figure 16:
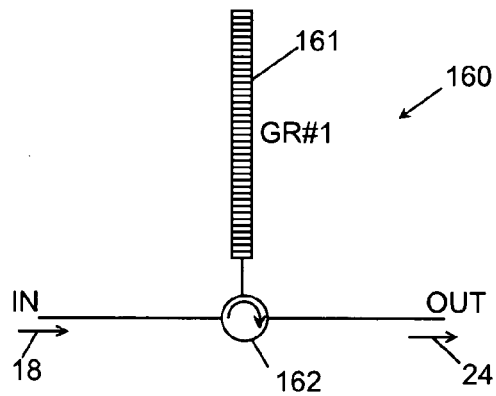
FIG. 16 shows an apparatus according to the present invention comprising a pure 3rd order dispersion compensating grating.
Figure 17:
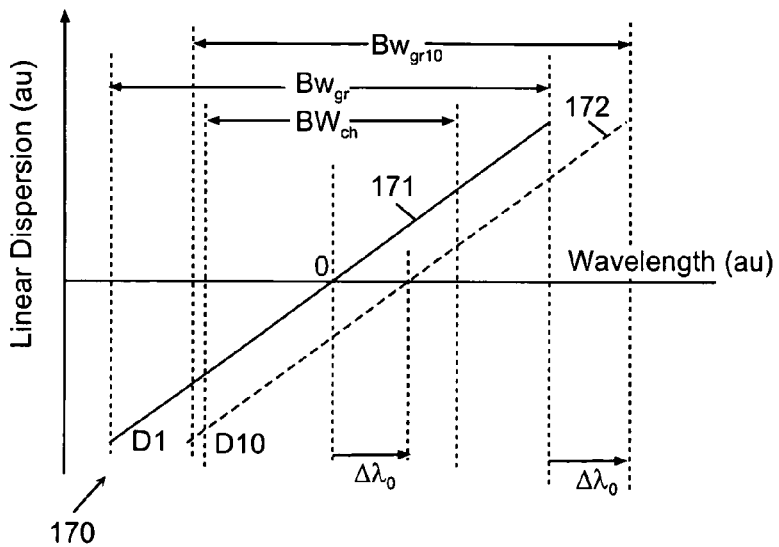
FIG. 17 shows the dispersion mapping of the apparatus shown in FIG. 16.

From FIG. 17 and Equation (14), it is evident that the single-grating tuneable module 160, shown in FIG. 16, always results in a variation of the linear dispersion across the channel bandwidth (proportional to coefficient $b_1$). Although such a variation might not be of great consequences at bit rates $\leq 10$ Gbit/s, it should be eliminated when such a tuneable dispersion compensation module is used at bit rates above 10 Gbit/s. To achieve that an additional grating is used with opposite third-order dispersion coefficient, i.e., $b_2=-b_1$ (see the apparatus shown in FIG. 21). The second grating can be either unchirped, pure $3^{rd}$-order dispersion grating (case 1) or non-linearly chirped, $2^{nd}+3^{rd}$ order dispersion grating with $a_2 \neq 0$ (case 2). We also stress that both gratings can be non-linearly chirped with $2^{nd}+3^{rd}$ order dispersion with $b_2=-b_1$ and $a_2 \neq -a_1$ (case 3).

Figure 21:
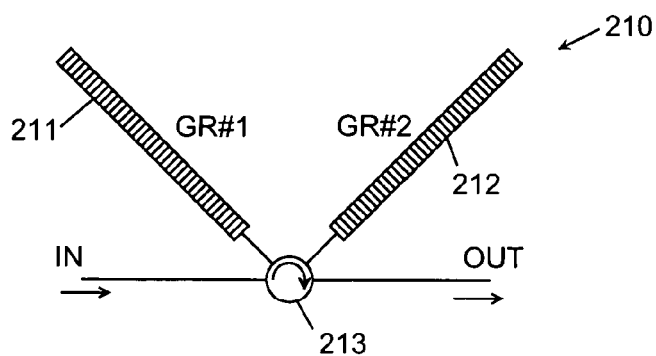
FIG. 21 shows an apparatus according to the present invention comprising two dispersion compensating gratings.

FIG. 21 shows a schematic of a tuneable chromatic-dispersion compensator module 210 using two gratings 211, 212 with opposite third-order dispersion coefficient, i.e., $b_2=-b_1$, and a four-port circulator 213. The four-port circulator 213 can be replaced with a cascade of two three-port circulators, or two 2×2 fibre or waveguide couplers, the latter being much more lossy.

Case 1: Two Unchirped, Pure $3^{rd}$-Order Dispersion Gratings

Figure 22:
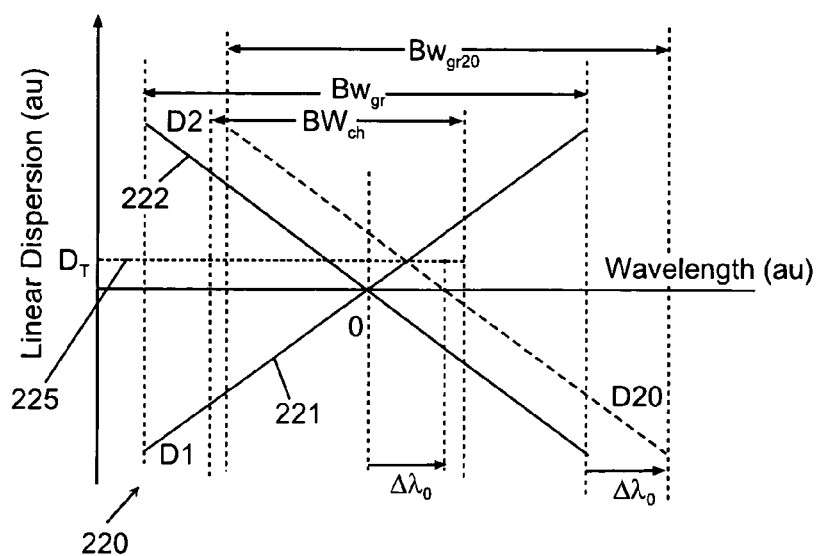
FIG. 22 shows the dispersion map of the apparatus shown in FIG. 21.

FIG. 22 shows the linear dispersion map 220 of the tuneable chromatic dispersion compensator module 210. When the channel bandwidth $BW_{ch}$ is aligned (centred) with respect to both grating bandwidths $BW_{gr}$, the linear dispersion at the centre of the channel bandwidth is zero. The chromatic dispersion tuning can be achieved by applying uniform perturbations, such as uniform temperature or strain, along the grating length. Such uniform perturbations result in a relative shift of one of the grating spectrum (e.g. grating#2—$BW_{gr20}$) with respect to the channel bandwidth $BW_{ch}$ by $\Delta\lambda 0$. If without loss of generality we assume that grating#1 remains unchanged, the linear dispersion of grating#2 is given by $D_{20}(\lambda)=D_2(\lambda-\Delta\lambda_0)$.

The total dispersion $D_T(\lambda;\Delta\lambda 0)$ 225 of the tuned DCM 210 is the sum of the two individual dispersions 221, 222, given by:

$$D_T(\lambda;\Delta\lambda_0)=D_1(\lambda)+D_{20}(\lambda)=D_1(\lambda)+D_2(\lambda-\Delta\lambda_0)=b_1\Delta\lambda_0 \quad (15)$$

From Equation (15), it can be seen that the total dispersion 225 is constant across the channel bandwidth BWch. At each tuning setting, the obtained linear dispersion is proportional to the relative spectral shift $\Delta\lambda_0$. From FIG. 22, it can be seen that the relative spectral shift is limited within the range $-\frac{1}{2}(BW_{gr}-BW_{ch}) \leq \Delta\lambda_0 \leq +\frac{1}{2}(BW_{gr}-BW_{ch})$ and, therefore, the maximum linear-dispersion tuning range is $\Delta D_{max}=b_1(BW_{gr}-BW_{ch})$. The actual total dispersion varies within a range $-\frac{1}{2}\Delta D_{max} \leq D_T \leq +\frac{1}{2}\Delta D_{max}$. Although the actual dispersion and tuning range is similar to the ones in prior art (obtained with gratings with same $b_1$ parameters), the current unchirped gratings are much shorter. Use of shorter, unchirped gratings is preferred since these gratings are easier to manufacture, using current writing techniques, resulting in higher yields and lower cost. In addition, shorter gratings are easier to package. Put it in a different way, for the same grating length, the proposed design provides larger tuning range.

In the case that the two third-order dispersion coefficients are slightly different, i.e. $b_2 \approx -b_1$, the total dispersion $D_T(\lambda)$ of the tuned DCM becomes:

$$D_T(\lambda;\Delta\lambda_0)=D_1(\lambda)+D_2(\lambda-\Delta\lambda_0)=(b_1+b_2)\lambda-b_2\Delta\lambda_0 \quad (16)$$

where $(b1+b2) \approx 0$. From Equation (16), it can be seen that in this case there is a slight wavelength dependence of the linear dispersion across the channel bandwidth. However this dependence is much smaller than the one shown in FIG. 17 (one grating case) and will cause minimal degradation in the device performance.

If grating#1 in the tuneable dispersion compensation module 210, shown in FIG. 21, is considered to be identical to the previously used grating, shown in FIGS. 18 to 20, then we can design the complimentary grating#2 to have a peak reflectivity ($R_{max}$) of 90%, a −0.5 dB bandwidth ($BW_{-0.5\,dB}$) of 0.8 nm, a −30 dB bandwidth ($BW_{-30\,dB}$) of 1 nm and a third-order dispersion coefficient $D_3=b_2=-2000$ ps/nm$^2$. Note that again the second-order dispersion coefficient is zero, i.e., $D_2=a_2=0$ ps/nm. The centre wavelength is $\lambda_0=1550$ nm. Grating#2 is designed using an inverse-scattering layer-peeling algorithm [10–12].

Figure 23:
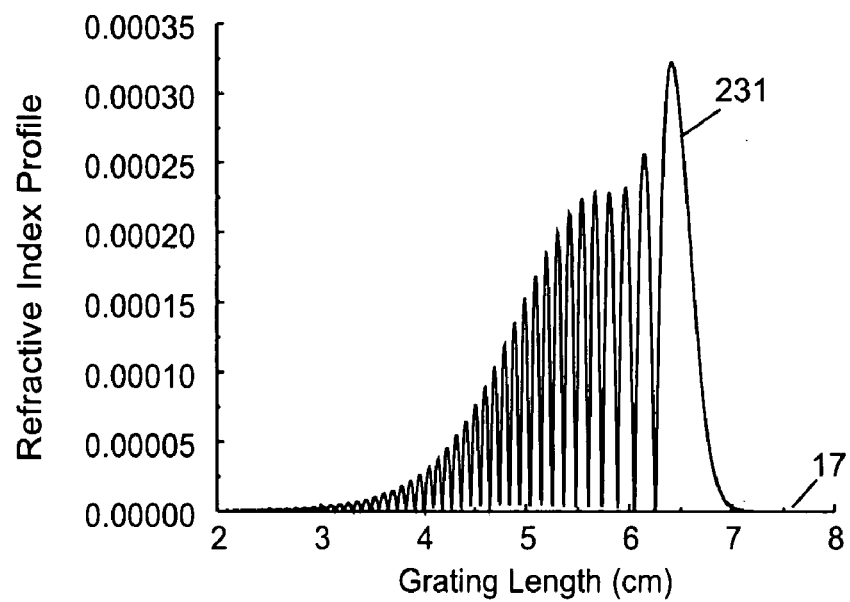
FIGS. 23 to 30 show design and performance curves of an apparatus according to the present invention comprising one unchirped, pure 3rd-order dispersion grating and a non-linearly chirped combined 2nd+3rd order dispersion grating.

FIG. 23 shows the refractive index profile 231 of the grating described above. The grating is unchirped, i.e., it has a constant underlying period $\Lambda_0=\lambda_0/2n_0$, where $\lambda_0$ is the wavelength at the grating bandwidth centre. $\pi$ spatial phase shifts (not shown in the figure) are introduced at the points along the grating length where the refractive index profile approaches zero. The refractive index profile is of a Moire type with varying Moire period ($\Lambda M$). The refractive index profile peaks gradually increase along the grating length, as the corresponding reflected wavelengths move away from the edges towards the centre of the reflection bandwidth. Notice also that the Moire periodicity increases along the grating length.

Figure 24:
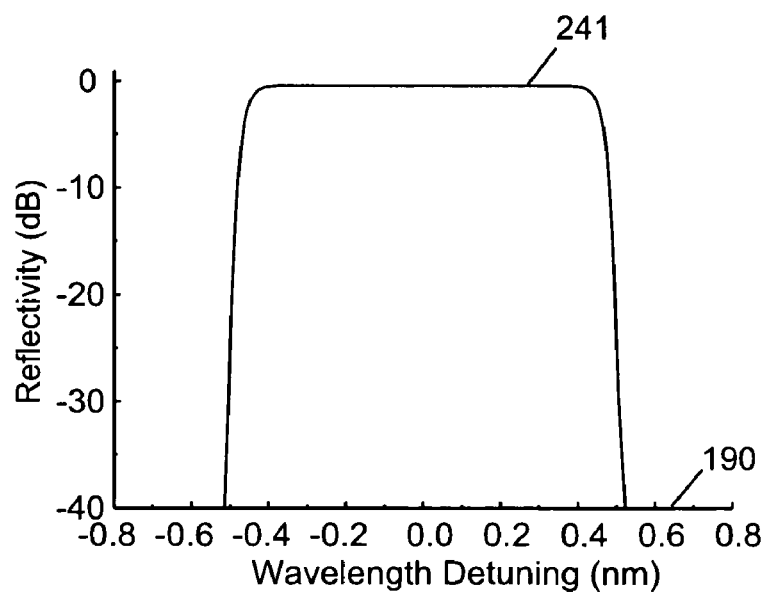
Figure 25:
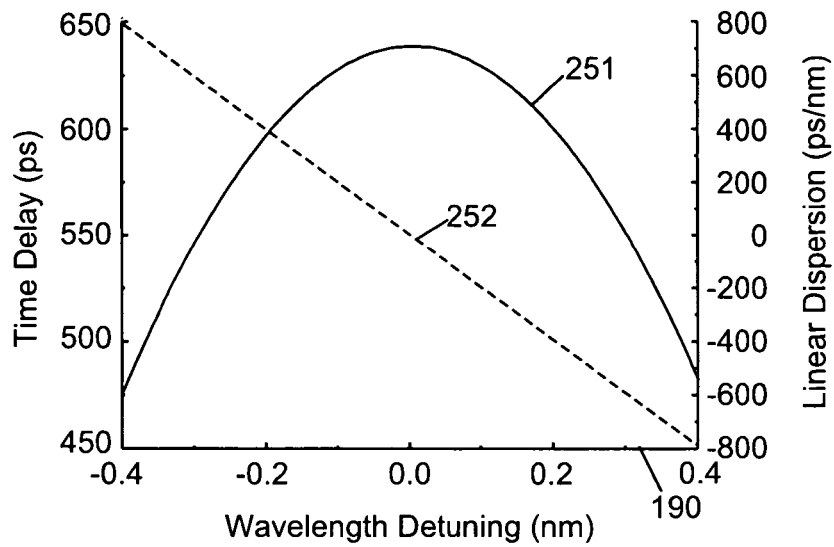

FIG. 24 shows the reflection spectrum 241 of the grating shown in FIG. 23. This is identical to the one shown in FIG. 19. FIG. 25 shows the corresponding time delay 251 (solid line—left axis) and linear dispersion variation 252 (dashed line—right axis) across the reflection bandwidth. It should be stressed that although grating#1 (FIG. 18) and grating#2 (FIG. 23) have the same reflectivity (c.f. FIGS. 19 & 24) and opposite dispersion spectra (c.f. FIGS. 20 & 25), their refractive index profiles are not mirror images of one another (c.f. FIGS. 18 & 23).

Figure 26:
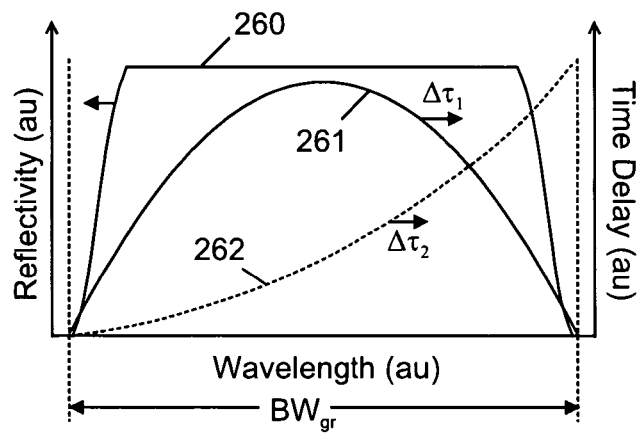
Figure 27:
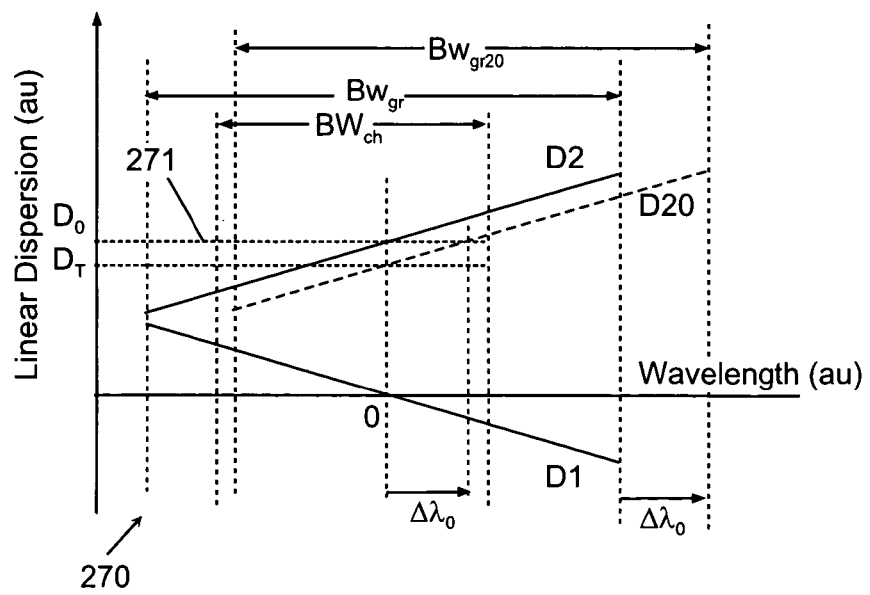

Case 2: One Unchirped, Pure $3^{rd}$-Order Dispersion Grating and a Non-Linearly Chirped Combined $2^{nd}+3^{rd}$ Order Dispersion Grating Another tuneable dispersion-compensation-module variant can be achieved by replacing one unchirped, pure 3rd-order dispersion grating, described in case 1, with a non-linearly chirped 2nd+3rd order dispersion grating (similar to ones used in prior art) in the apparatus shown in FIG. 21. FIG. 26 shows a schematic of the reflectivity 260 (left axis) and time-delay variation $\Delta\tau$ 261, 262 (right axis) as a function of the wavelength. $\Delta\tau_1$ 261 and $\Delta\tau_2$ 262 refer to grating#1 and grating#2, respectively (see FIG. 21). The corresponding linear dispersion maps is shown in FIG. 27. The dispersion variation across the grating bandwidth is described by Equations (12) and (13) with the coefficients where $a2 \neq a1=0$ and $b2=-b1$.

When the channel bandwidth $BW_{ch}$ is aligned (centred) with respect to both grating bandwidths $BW_{gr}$, the total linear dispersion 271 at the centre of the channel bandwidth is $D_0=a_2$. The chromatic dispersion tuning can be achieved by applying uniform perturbations, such as uniform temperature or strain, along the grating length. Such uniform perturbations result in a relative shift of one of the grating spectrum (e.g. grating#2—$BW_{gr20}$) with respect to the channel bandwidth $BW_{ch}$ by $\Delta\lambda_0$. If, without loss of generality, we assume that grating#1 remains unshifted, the linear dispersion of grating#2 is given by $D_{20}(\lambda)=D_2(\lambda-\Delta\lambda_0)$.

The total dispersion $D_T(\lambda;\Delta\lambda_0)$ of the tuned DCM is the sum of the two individual dispersions, given by:

$$D_T(\lambda;\Delta\lambda_0)=D_1(\lambda)+D_{20}(\lambda)=D_1(\lambda)+D_2(\lambda-\Delta\lambda_0)=D_0+b_1\Delta\lambda_0 \quad (17)$$

From Equation (17), it can be seen that the total dispersion is constant across the channel bandwidth $BW_{ch}$. At each tuning setting, the obtained linear dispersion is proportional to the relative spectral shift $\Delta\lambda_0$. From FIG. 22, it can be seen that the relative spectral shift is limited within the range $-\frac{1}{2}(BW_{gr}-BW_{ch}) \leq \Delta\lambda_0 \leq +\frac{1}{2}(BW_{gr}-BW_{ch})$ and, therefore, the maximum linear-dispersion tuning range is $\Delta D_{max}=b_1(BW_{gr}-BW_{ch})$. The actual total dispersion varies within a range $D_0-\frac{1}{2}\Delta D_{max} \leq D_T \leq D_0+\frac{1}{2}\Delta D_{max}$. Compared to prior art and previous case 1, such a tuneable DCM, although showing similar dynamic range, offers larger absolute values of total dispersion. Such a device, therefore, can be used to compensate the dispersion of longer optical links.

In the case that the two third-order dispersion coefficients are slightly different, i.e. $b2 \approx -b1$, the total dispersion $D_T(\lambda)$ of the tuned DCM becomes:

$$D_T(\lambda;\Delta\lambda_0)=D_1(\lambda)+D_2(\lambda-\Delta\lambda_0)=(b_1+b_2)\lambda-b_2\Delta\lambda_0+D_0 \quad (18)$$

where $(b_1+b_2) \approx 0$. From Equation (18), it can be seen that in this case there is a slight wavelength dependence of the linear dispersion across the channel bandwidth. However this dependence is much smaller than the one shown in FIG. 17 (one grating case) and will cause minimal degradation in the device performance.

Figure 28:
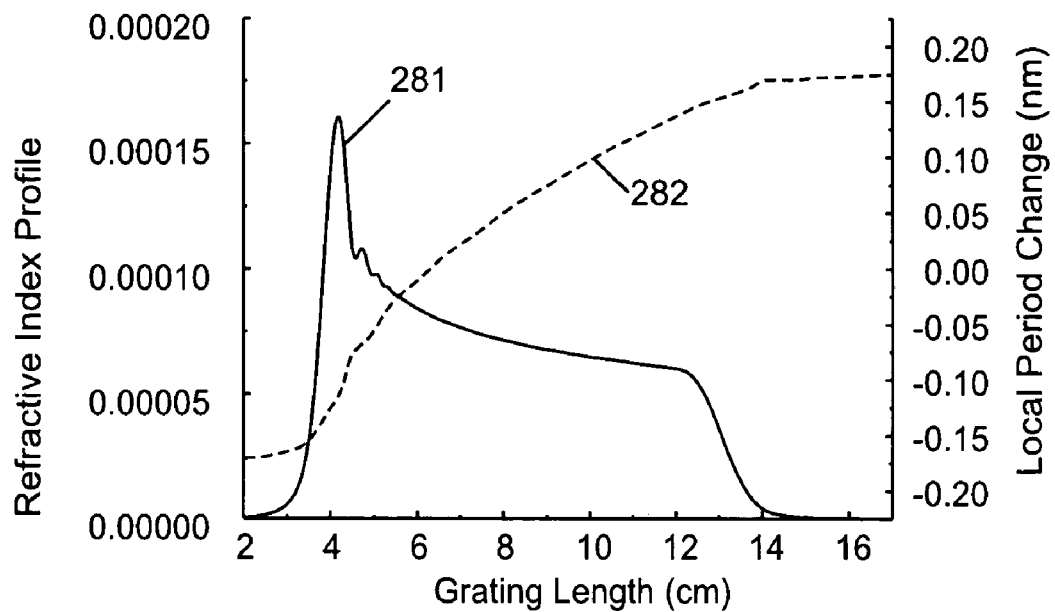

If grating#1 in the tuneable dispersion compensation module 210, shown in FIG. 21, is considered to be identical to the previously used grating, shown in FIGS. 18 to 20, then we can design the complimentary grating#2 to have a peak reflectivity ($R_{max}$) of 90%, a −0.5 dB bandwidth ($BW_{-0.5\ dB}$) of 0.8 nm, a −30 dB bandwidth ($BW_{-30\ dB}$) of 1 nm. The third-order dispersion coefficient $D_3=b_2=+2000$ ps/nm$^2$ and the second-order dispersion coefficient $D_0=a_2=+1000$ ps/nm. The centre wavelength is $\lambda_0=1550$ nm. Grating#2 is designed using an inverse-scattering layer-peeling algorithm [10–12]. Refractive index profile of the non-linearly chirped grating#2 (solid line—left axis). FIG. 28 shows the refractive index profile 281 and local period change 282 corresponding to a grating with a peak reflectivity $R_{max}=0.90$, $BW_{-0.5\ dB}=0.8$ nm, $BW_{-30\ dB}=1$ nm The second-order dispersion coefficient is $D_0=a_2=+1000$ ps/nm and third-order dispersion coefficient $D_3=b_2=+2000$ ps/nm$^2$.

Figure 29:
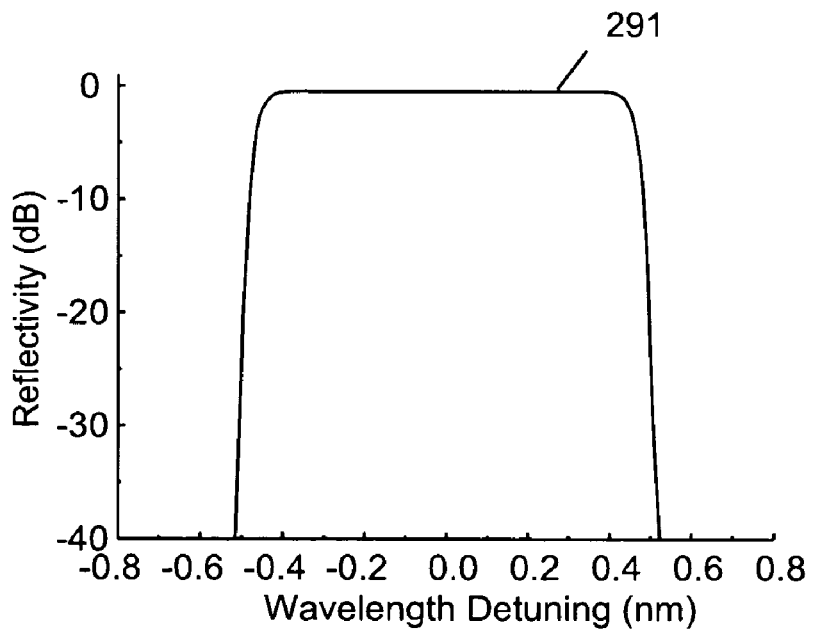
Figure 30:
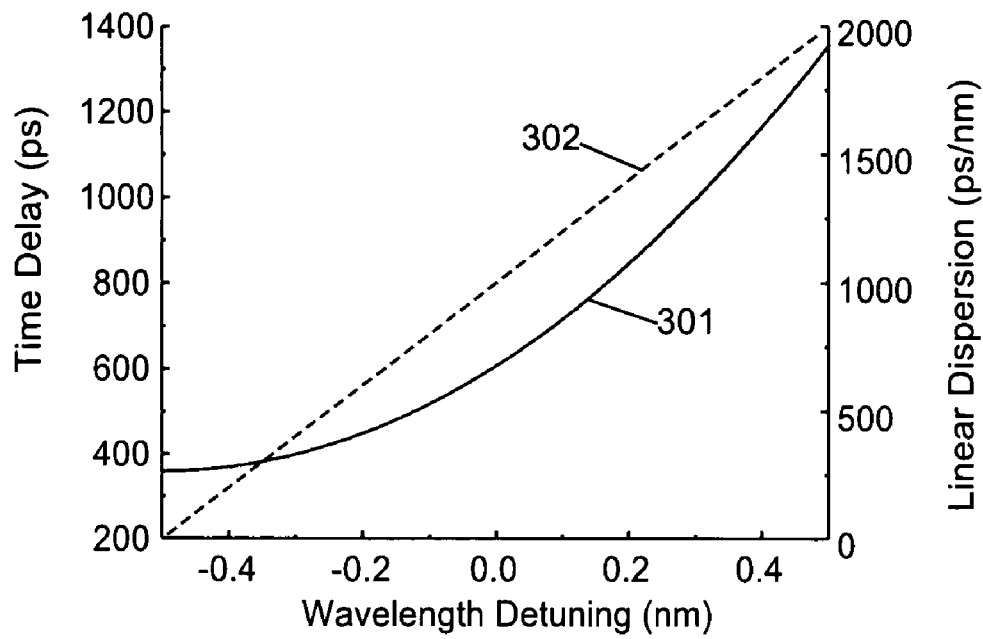

FIG. 29 shows the reflection spectrum 291 of the grating shown in FIG. 28. This is identical to the one shown in FIG. 19. FIG. 30 shows the corresponding time delay 301 (solid line—left axis) and linear dispersion variation 302 (dashed line—right axis) across the reflection bandwidth 3.

Figure 31:
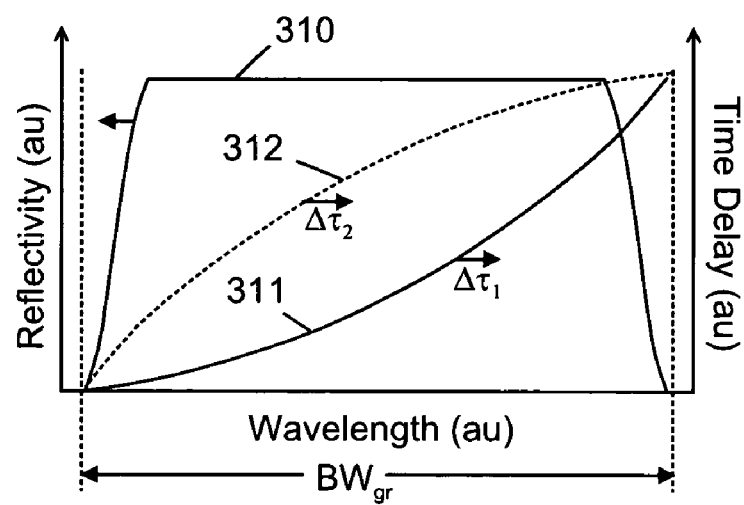
FIGS. 31 to 35 show design and performance curves for an apparatus according to the present invention comprising two different non-linearly chirped gratings that show combined 2nd+3rd order dispersion.
Figure 32:
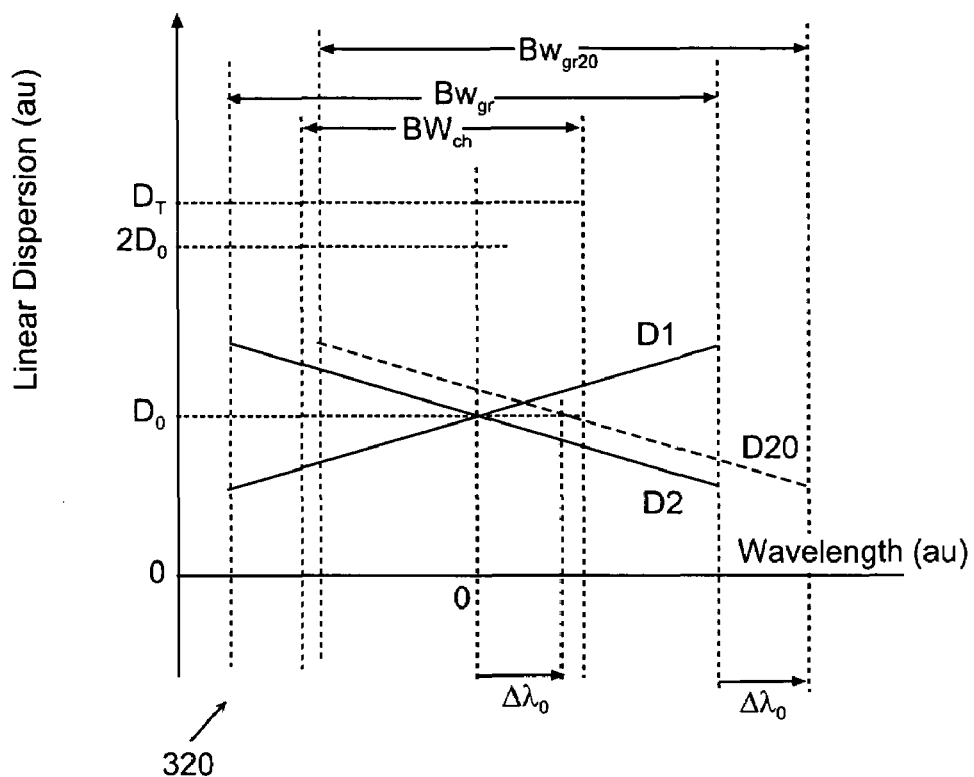

Case 3: Two Different Non-Linearly-Chirped, Combined $2^{nd}+3^{rd}$ Order Dispersion Gratings The case of a tuneable DCM that uses two different non-linearly chirped gratings that show combined 2nd+3rd order dispersion will now be described. FIG. 31 shows a schematic of the reflectivity 310 (left axis) and time-delay variation 311, 312 $\Delta\tau$ (right axis) as a function of the wavelength. $\Delta\tau 1$ and $\Delta\tau 2$ refer to grating#1 and grating#2, respectively (see FIG. 21). The corresponding linear dispersion maps 320 are shown in FIG. 32. The dispersion variation across the grating bandwidth is described by Equations (12) and (13) with the coefficients where $a2 \neq a1 \neq 0$ and $b2=-b1$.

When the channel bandwidth $BW_{ch}$ is aligned (centred) with respect to both grating bandwidths $BW_{gr}$, the total linear dispersion at the centre of the channel bandwidth is $D_0=a_1+a_2$. The chromatic dispersion tuning can be achieved by applying uniform perturbations, such as uniform temperature or strain, along the grating length. Such uniform perturbations result in a relative shift of one of the grating spectrum (e.g. grating#2—$BW_{gr20}$) with respect to the channel bandwidth $BW_{ch}$ by $\Delta\lambda_0$. If, without loss of generality, we assume that grating#1 remains unshifted, the linear dispersion of grating#2 is given by $D_{20}(\lambda)=D_2(\lambda-\Delta\lambda_0)$.

The total dispersion $D_T(\lambda;\Delta\lambda_0)$ of the tuned DCM is the sum of the two individual dispersions, given by:

$$D_T(\lambda;\Delta\lambda_0)=D_1(\lambda)+D_{20}(\lambda)=D_1(\lambda)+D_2(\lambda-\Delta\lambda_0)=(a_1+a_2)+b_1\Delta\lambda_0 \quad (19)$$

From Equation (19), it can be seen that the total dispersion is constant across the channel bandwidth $BW_{ch}$. The bias term in this case is $(a_1+a_2)$. The case shown in FIG. 32 corresponds to $a_1=a_2=D_0$. At each tuning setting, the obtained linear dispersion is proportional to the relative spectral shift $\Delta\lambda_0$. From FIG. 32, it can be seen that the relative spectral shift is limited within the range $-\frac{1}{2}(BW_{gr}-BW_{ch}) \leq \Delta\lambda_0 \leq +\frac{1}{2}(BW_{gr}-BW_{ch})$ and, therefore, the maximum linear-dispersion tuning range is $\Delta D_{max}=b_1(BW_{gr}-BW_{ch})$. The actual total dispersion varies within a range $2D_0-\frac{1}{2}\Delta D_{max} \leq D_T \leq 2D_0+\frac{1}{2}\Delta D_{max}$. Compared to prior art and previous cases 1 & 2, such a tuneable DCM based on dissimilar non-linearly-chirped gratings, although showing similar dynamic range, it offers even larger absolute values of total dispersion. Such a device, therefore, can be used to compensate the dispersion of even longer optical links.

In the case that the two third-order dispersion coefficients are slightly different, i.e. $b_2 \approx -b_1$, the total dispersion $D_T(\lambda)$ of the tuned DCM becomes:

$$D_T(\lambda;\Delta\lambda_0)=D_1(\lambda)+D_2(\lambda-\Delta\lambda_0)=(b_1+b_2)\lambda-b_2\Delta\lambda_0+2D_0 \quad (20)$$

where $(b_1+b_2) \approx 0$. From Equation (20), it can be seen that in this case there is a slight wavelength dependence of the linear dispersion across the channel bandwidth. However this dependence is much smaller than the one shown in FIG. 17 (one grating case) and will cause minimal degradation in the device performance.

If grating#1 in the tuneable dispersion compensation module, shown in FIG. 21, is considered to be identical to the previously used grating, shown in FIGS. 28 to 30, then we can design the complimentary grating#2 to have a peak reflectivity ($R_{max}$) of 90%, a −0.5 dB bandwidth ($BW_{-0.5\ dB}$) of 0.8 nm, a −30 dB bandwidth ($BW_{-30\ dB}$) of 1 nm. The third-order dispersion coefficient should be $D_3=b_2=-2000$ ps/nm$^2$ and the second-order dispersion coefficient remains $D_0=a_2=+1000$ ps/nm. The centre wavelength is $\lambda_{0=1550}$ nm. Grating#2 is designed using an inverse-scattering layer-peeling algorithm [10–12].

Figure 33:
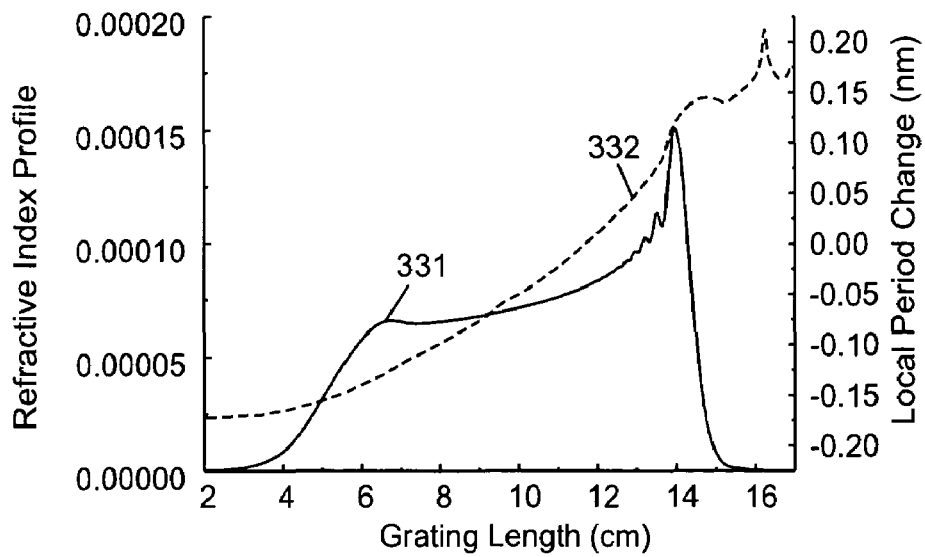
Figure 34:
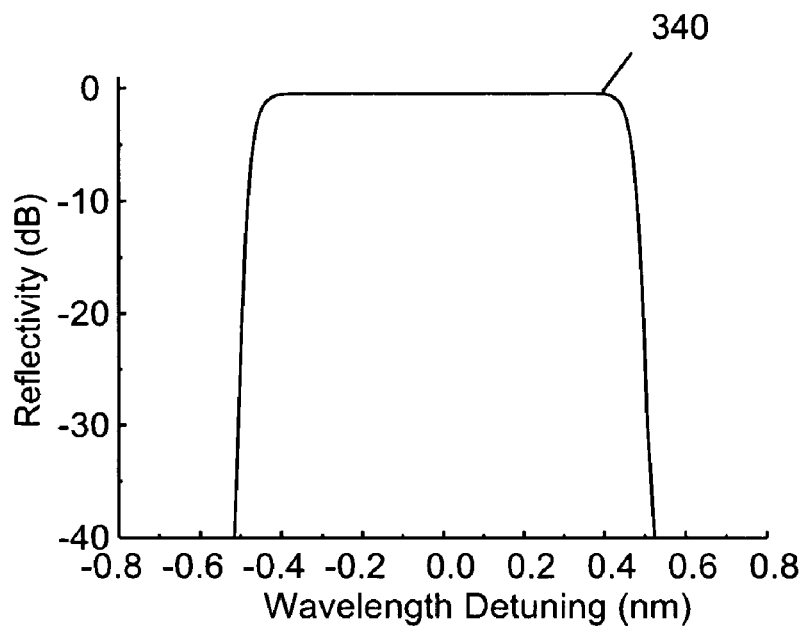
Figure 35:
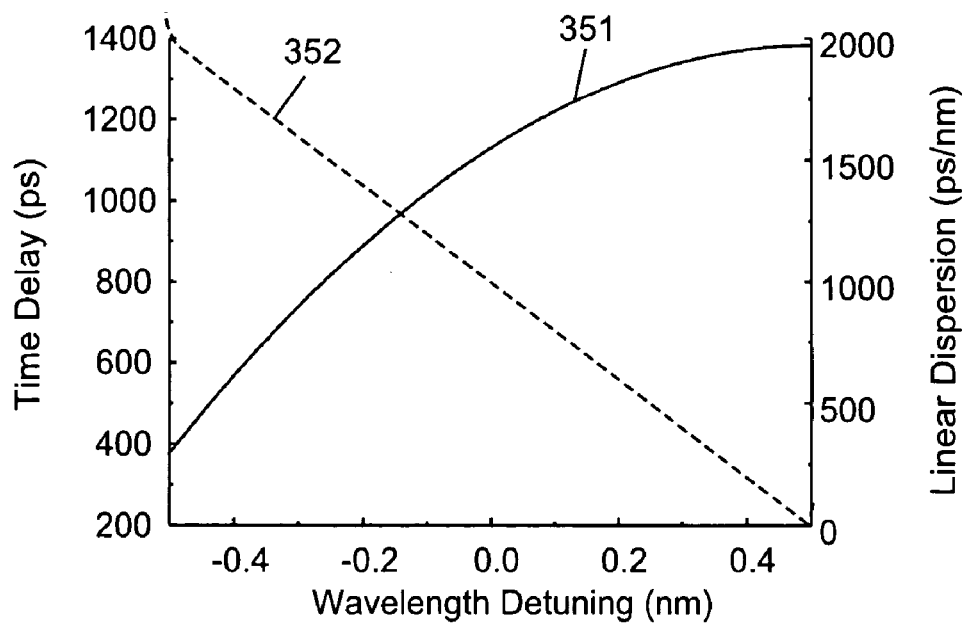

FIG. 34 shows the reflection spectrum 340 of the grating having the refractive index profile 331 and local period change 332 shown in FIG. 33. The reflection spectrum 340 is is identical to the one shown in FIG. 29. FIG. 35 shows the corresponding time delay 351 (solid line—left axis) and linear dispersion variation 352 (dashed line—right axis) across the reflection bandwidth. The centre wavelength used in the analysis is $\lambda_0=1550$ nm, peak reflectivity $R_{max}=0.90$, $BW_{-0.5\ dB}=0.8$ nm, $BW_{-30\ dB}=1$ nm. The second-order dispersion coefficient is $D_0=a_2=+1000$ ps/nm and third-order dispersion coefficient $D_3=b_2=-2000$ ps/nm$^2$.

Multichannel Tuneable DCMs

The unchirped, pure third-order dispersion gratings, and the matching non-linearly chirped gratings, can be designed and manufactured to have multichannel spectral characteristics using the techniques described in the patent application published according to the patent cooperation treaty having the patent publication number WO0231552A1, which is hereby incorporated by reference herein. Multichannel gratings can be designed using any of the exact inverse-scattering, layer-peeling techniques or any approximate inverse Fourier Transform based algorithm. The multichannel gratings can replace their respective counterparts in all the previously disclosed embodiments to provide multichannel tunable DCMs.

It is to be appreciated that the embodiments of the invention described above with reference to the accompanying drawings have been given by way of example only and that modifications and additional components may be provided to enhance the performance of the apparatus.

The present invention extends to the above mentioned features taken singularly or in any combination and the embodiments shown in the figures are intended to be non-limiting embodiments.

REFERENCES

[1] W. H. Loh, F. Q. Zhou and J. J. Pan, "Sampled fibre grating based-dispersion slope compensator", *IEEE Photonics Technology Letters*, vol. 11, no. 10, pp. 1280–2, (1999), see also correction, W. H. Loh, et al. *IEEE Photonics Technology Letters*, vol. 12, no. 3, p. 362 (2000).

[2] J. Martin, J. Lauzon, S. Thibault and F. Ouellette, "Novel writing technique of long in-fiber Bragg grating and investigation of the linear chirp component", in *Optical Fiber Communication Conference*, 1994, postdeadline paper PD29.

[3] R. I. Laming, N. Robinson, P. L. Scrivener, M. N. Zervas, S. Barcelos, L. Reekie and J. A. Tucknott, "A dispersion tunable grating in a 10 Gb/s 100-200 km step-index fiber link", *IEEE Photonics Technology Letters*, vol. 8, no. 3, pp. 428–430 (1996).

[4] B. J. Eggleton, K. A. Ahmed, F. Ouellette, P. A. Krug, and H. -F. Liu, "Recompression of pulses broadened by transmission through 10 km of non-dispersion-shifted fiber at 1.55 μm using 40 mm-long optical fiber Bragg gratings with tunable chirp and central wavelength", *IEEE Photonics Technology Letters*, vol. 7, no. 5, pp. 494–496 (1995).

[5] T. Imai, T. Komukai and M. Nakazawa, "Dispersion tuning of a fiber Bragg grating without a center wavelength shift by applying a strain gradient", *IEEE Photonics Technology Letters*, vol. 10, no. 6, pp. 845–847, (1998).

[6] K. Ennser, M. N. Zervas and R. I. Laming, "Optimization of linearly chirped fiber gratings for optical communications", *IEEE Journal of Quantum Electronics*, vol. 34, no. 5, pp. 770–778 (1998).

[7] K. -M. Feng, J. -X. Cai, V. Grubsky, D. S. Starodubov, M. I. Hayee, S. Lee, X. Jiang, A. E. Willner and J. Feinberg, "Dynamic dispersion compensation in a 10 Gb/s optical system using a novel voltage tuned nonlinearly chirped fibre Bragg grating", *IEEE Photonics Technology Letters*, vol. 11, no. 3, pp. 373-375, (1999).

[8] J. A. J. Fells, S. E. Kanellopoulos, P. J. Bennet, V. Baker, H. F. M. Priddle, W. S. Lee, A. J. Collar, C. B. Rogers, D. P. Goodchild, R. Feced, P. J. Pugh, S. J. Clements and A. Hadjifotiou, "Twin fiber grating tunable dispersion compensator", *IEEE Photonics Technology Letters*, vol. 13, no. 9, pp. 984–986, (2001).

[9] J. A. J. Fells, P. J. Bennet, R. Feced, P. Ayliffe, J. Wakefield, H. F. M. Priddle, V. Baker, S. E. Kanellopoulos, C. Boylan, S. Sahil, W. S. Lee, S. J. Clements and A. Hadjifotiou, "Widely tunable twin fiber grating dispersion compensator for 80 Gbit/s", in *OFC* 2001, post-deadline paper PD11.

[10] R. Feced, M. N. Zervas and M. Miguel, "An efficient inverse scattering algorithm for the design of nonuniform fibre Bragg gratings", *IEEE J. Quantum Electronics*, vol. 35, p. 1105–1115 (1999).

[11] L. Poladian, "Simple grating synthesis algorithm", Opt. Lett., vol. 35, pp. 787–789 (2000).

[12] J. Skaar, L. Wang, and T. Erdogan, "On the synthesis of Bragg gratings by layer peeling", *IEEE J. Quantum Electronics*, vol. 37, p. 165–173 (2001).

The invention claimed is:

1. Apparatus for dispersion compensating a signal that propagates along a signal path, comprising:
  a grating defined by regions; and
  a tuning means; and
  wherein;
  the grating is characterized by a wavelength operating range and a group delay that varies with wavelength;
  the group delay is equal at a plurality of pairs of wavelengths that are separated within the wavelength operating range; and
  the grating reflects each wavelength pair from a same region of the grating, and different wavelength pairs from different regions of the grating;
  the apparatus further comprising a dispersion compensator configured to provide primary compensation of the signal, wherein the primary compensator is tunable.

2. The apparatus of claim 1 wherein the grating is a fibre Bragg grating.

3. The apparatus of claim 1 wherein the grating is characterised by a second order dispersion and a third order dispersion, and wherein a first magnitude defined by a product of half the third order dispersion multiplied by the wavelength operating range is greater than a second magnitude defined by the second order dispersion.

4. The apparatus of claim 1 wherein the grating comprises a plurality of lines separated from one another by a separation, and wherein the separation between the lines is equal.

5. The apparatus of claim 1 wherein the grating comprises a plurality of lines separated from one another by a separation, and wherein the separation between the lines varies.

6. The apparatus of claim 1 wherein the tuning means comprises one of a fibre stretcher, a fibre compressor, a bender, or a heating element.

7. The apparatus of claim 1 wherein:
  the grating is defined by a length; and
  the tuning means is configured to perturb the grating such that the grating is defined by a uniform strain applied along at least a portion of its length.

8. The apparatus of claim 1 wherein:
  the grating is defined by a length; and
  the tuning means perturbs the grating linearly along at least a portion of its length.

9. The apparatus of claim 1 wherein:
  the grating is defined by a length; and
  the tuning means perturbs the grating non-linearly along at least a portion of its length.

10. The apparatus of claim 1 wherein the dispersion compensator comprises dispersion compensating fibre.

11. The apparatus of claim 1 and wherein:
  the grating is a first grating; and
  the dispersion compensator comprises a chirped fibre Bragg grating.

12. The apparatus of claim 11 wherein the dispersion compensator comprises two fibre Bragg gratings that are characterised by a chirp having a linear component and a non-linear component.

13. The apparatus of claim 12 wherein the two fibre Bragg gratings are of the same design.

14. The apparatus of claim 12 wherein the two fibre Bragg gratings are of different designs.

15. Apparatus for dispersion compensating a signal that propagates along a signal path, comprising:
- a grating;
- a tuning means;
- wherein, the first grating is characterized by a wavelength operating range, a center wavelength, and a group delay that varies with wavelength, wherein the center wavelength corresponds to a wavelength at which the variation of group delay with wavelength is zero, the group delay is equal at a plurality of pairs of wavelengths, each pair of wavelengths that are separated within the wavelength operating range having a first wavelength that is less than the center wavelength and a second wavelength that is greater than the center wavelength, and wherein the grating reflects each wavelength pair from the same region of the grating, and different wavelength pairs from different regions of the grating; and
- a dispersion compensator to provide primary compensation of the signal, wherein the dispersion compensator is tunable.

16. The apparatus of claim 15 wherein the dispersion compensator comprises an optical fiber.

17. The apparatus of claim 15 wherein the dispersion compensator comprises a chirped fibre Bragg grating.

* * * * *